United States Patent
Inoguchi et al.

(10) Patent No.: US 6,215,594 B1
(45) Date of Patent: Apr. 10, 2001

(54) STEREOSCOPIC IMAGE DISPLAY APPARATUS AND IMAGE PROCESSING METHOD

(75) Inventors: Kazutaka Inoguchi, Kawasaki; Naosato Taniguchi, Urawa; Hideki Morishima, Kawasaki; Hiroyasu Nose, Tokyo; Tsutomu Osaka, Kawasaki, all of (JP)

(73) Assignee: Mixed Reality Systems Laboratory Inc., Kanagawa-ken (JP)

( * ) Notice: Subject to any disclaimer, the term of this patent is extended or adjusted under 35 U.S.C. 154(b) by 0 days.

(21) Appl. No.: 09/048,103

(22) Filed: Mar. 26, 1998

(30) Foreign Application Priority Data

Jun. 23, 1997 (JP) .................................................. 9-181766

(51) Int. Cl.$^7$ ............................ G02B 27/10; G02B 27/22
(52) U.S. Cl. ........................................... 359/619; 359/462
(58) Field of Search ................................... 359/619, 626, 359/462, 466

(56) References Cited

U.S. PATENT DOCUMENTS

| | | | |
|---|---|---|---|
| 4,872,750 | 10/1989 | Morishita | 353/7 |
| 5,049,987 | 9/1991 | Hoppenstein | 348/48 |
| 5,264,964 | 11/1993 | Faris | 359/465 |
| 5,410,345 * | 4/1995 | Eichenlaub | 348/59 |
| 5,936,774 | 8/1999 | Street | 359/630 |

FOREIGN PATENT DOCUMENTS

| | | |
|---|---|---|
| 829 744 | 3/1998 | (EP) . |
| 0860728 | 8/1998 | (EP) . |
| 9-34036 | 2/1997 | (JP) . |
| WO96/41227 | 12/1996 | (WO) . |

* cited by examiner

Primary Examiner—Ricky Mack
(74) Attorney, Agent, or Firm—Fitzpatrick, Cella, Harper & Scinto

(57) ABSTRACT

The present invention provides a stereoscopic image display apparatus comprising an illumination light source, an illuminating apparatus in which an optical system for guiding light from the illumination light source with directivity in predetermined regularity is housed in a housing, and a transmissive image sheet in which a stripe composite image produced by dividing a plurality of parallax images into stripes and arranging the stripes in a predetermined order is provided on a surface of a transparent sheet, wherein the transmissive image sheet is detachably mounted on the housing and the stripe composite image illuminated by the light from the illuminating apparatus is observed as a stereoscopic image, and wherein the transmissive image sheet is mounted on the housing so that a position of the transmissive image sheet can be adjusted by an adjusting device.

53 Claims, 25 Drawing Sheets

STEREOSCOPIC IMAGE DISPLAY APPARATUS AND IMAGE PROCESSING METHOD

BACKGROUND OF THE INVENTION

1. Field of the Invention

The present invention relates to a stereoscopic image display apparatus by which a stereoscopic image can be observed without a need for special spectacles (polarization spectacles), liquid-crystal shutter spectacles, or the like, and to a transmissive image sheet and an illuminating apparatus used therein. More particularly, the invention concerns the apparatus suitably applicable to the case wherein a transmissive image sheet having a stripe composite image produced from a plurality of still images with parallax such as photographs or CG images is detachably mounted on an illuminating apparatus for illuminating the transmissive image sheet and the stripe composite image is observed as a stereoscopic image.

2. Related Background Art

A widely known method out of the conventional stereoscopic still image display methods for permitting observation of stereoscopic image without polarization spectacles is a method using a stereoscopic image apparatus constructed in such a manner that a plurality of parallax images are divided into a plurality of stripe parallax images in a vertically long stripe shape, a vertical stripe composite image is produced by arranging these stripe parallax images in a predetermined order, and a lenticular lens sheet is bonded to the front surface of the vertical stripe composite image, whereby the plural stripe parallax images forming the vertical stripe composite image are guided to predetermined positions respectively corresponding thereto, so as to permit an observer to recognize a stereoscopic still image.

Since the lenticular lens was disposed on the front surface of the stripe composite image, the conventional stereoscopic still image display method had a problem that the screen glares upon observation of stereoscopic image to be an eyesore.

Since the conventional method described above was the method for integrally forming the stripe composite image and the lenticular lens sheet, the conventional method had a problem that when there were plural pictures which the user desired to see stereoscopic pictures thereof, stereoscopic image devices in each of which the stripe composite image and lenticular lens sheet were integrally formed must be produced in the number corresponding to the number of pictures and thus the production of stereoscopic image devices took considerable labor and time.

SUMMARY OF THE INVENTION

An object of the present invention is to provide a stereoscopic image display apparatus that permits the observer to observe a good stereoscopic image without a glare of the screen and that permits the observer to observe plural stereoscopic images readily and in a good state with saving the time and labor for production of image, by properly arranging the transmissive image sheet having the stripe composite image and the illuminating apparatus for illuminating it, and also to provide the transmissive image sheet and illuminating apparatus used therein. The present invention involves the following configurations.

A stereoscopic image display apparatus of the present invention is either:

a stereoscopic image display apparatus comprising:
an illumination light source;
an illuminating apparatus having an optical system for guiding light from the illumination light source with directivity in predetermined regularity; and
a transmissive image sheet in which a stripe composite image produced by dividing a plurality of parallax images into stripes and arranging the stripes in a predetermined order is provided on a surface of a transparent sheet;
wherein the transmissive image sheet is detachably mounted on the illuminating apparatus and is illuminated by the light from the illumination light source through the optical system, whereby the stripe composite image is observed as a stereoscopic image; or a stereoscopic image display apparatus comprising:
an illuminating apparatus having
an illumination light source, and
an optical system for changing light from the illumination light source into patterned beams by a mask element consisting of a plurality of aperture portions and shield portions arrayed at predetermined pitch in a horizontal direction and in a vertical direction and for guiding the patterned beams onto a predetermined surface with directivity by a microlens element; and
a transmissive image sheet in which a stripe composite image produced by dividing a plurality of parallax images into stripes and arranging the stripes in a predetermined order is provided on a surface of a transparent sheet;
wherein the transmissive image sheet is detachably mounted on the illuminating apparatus and is illuminated by the light from the illumination light source through the optical system, whereby the stripe composite image is observed as a stereoscopic image.

A stereoscopic image display apparatus of the present invention is either:

(1-1) a stereoscopic image display apparatus comprising: an illumination light source; an illuminating apparatus in which an optical system for guiding light from the illumination light source with directivity in predetermined regularity is housed in a housing; and a transmissive image sheet in which a stripe composite image produced by dividing a plurality of parallax images into stripes and arranging the stripes in a predetermined order is provided on a surface of a transparent sheet; wherein the transmissive image sheet is detachably mounted on the housing and the stripe composite image illuminated by the light from the illuminating apparatus is observed as a stereoscopic image, and wherein the transmissive image sheet is mounted on the housing so that a position of the transmissive image sheet can be adjusted by adjusting means; or (1-2) a stereoscopic image display apparatus comprising: an illuminating apparatus in which an illumination light source and an optical system are housed in a housing, the optical system being arranged to change light from the illumination light source to patterned beams by a mask element consisting of plural aperture portions and shield portions arrayed at predetermined pitch in a horizontal direction and in a vertical direction and to guide the patterned beams onto a predetermined surface with directivity by a microlens element; and a transmissive image sheet in which a stripe composite image produced by dividing a plurality of parallax images into stripes and arranging the stripes in a predetermined order is provided on a surface of a transparent sheet; wherein the transmissive image sheet is detachably mounted on the housing and the stripe composite image illuminated by the light from the illuminating apparatus is observed as a stereoscopic image, and wherein the transmissive image sheet is mounted on the housing so that a position of the transmissive image sheet can be adjusted by adjusting means.

Particularly, in the configuration (1-1) or (1-2), (1-2-1) the adjusting means has a function to permit the transmissive image sheet to be moved vertically relative to the housing and to be rotated relative to the housing;

(1-3) a stereoscopic image display apparatus comprising: an illumination light source; an illuminating apparatus in which an optical system for guiding light from the illumination light source onto a predetermined surface with directivity in predetermined regularity is housed in a housing; and a transmissive image sheet in which a stripe composite image in which a plurality of stripe parallax images of a stripe shape are arrayed at predetermined repetition pitch is provided on a surface of a transparent sheet; wherein the transmissive image sheet is detachably mounted on the housing and the stripe composite image illuminated by the light from the illuminating apparatus is observed as a stereoscopic image, and wherein the illuminating apparatus and the transmissive image sheet are provided with a positioning mark for positioning between the illuminating apparatus and the transmissive image sheet;

(1-4) a stereoscopic image display apparatus comprising: an illuminating apparatus in which an illumination light source and an optical system are housed in a housing, the optical system being arranged to change light from the illumination light source to patterned beams by a mask element consisting of plural aperture portions and shield portions arrayed at predetermined pitch in a horizontal direction and in a vertical direction and to guide the patterned beams onto a predetermined surface with directivity by a microlens element; and a transmissive image sheet in which a stripe composite image in which a plurality of stripe parallax images of a stripe shape are arrayed at predetermined repetition pitch is provided on a surface of a transparent sheet; wherein the transmissive image sheet is detachably mounted on the housing and the stripe composite image illuminated by the light from the illuminating apparatus is observed as a stereoscopic image, and wherein the illuminating apparatus and the transmissive image sheet are provided with a positioning mark for positioning between the illuminating apparatus and the transmissive image sheet.

Particularly, in the configuration (1-3) or (1-4), (1-4-1) the positioning mark is provided on the housing and on the transparent sheet;

(1-5) a stereoscopic image display apparatus comprising: an illumination light source; an illuminating apparatus in which an optical system for guiding light from the illumination light source onto a predetermined surface with directivity in predetermined regularity is housed in a housing; and a transmissive image sheet in which a stripe composite image in which a plurality of stripe parallax images of a stripe shape are arrayed at predetermined repetition pitch is provided on a surface of a transparent sheet; wherein the transmissive image sheet is detachably mounted on the housing and the stripe composite image illuminated by the light from the illuminating apparatus is observed as a stereoscopic image, and wherein the transmissive image sheet is provided with a positioning mark for positioning relative to the illuminating apparatus.

Particularly, (1-5-1) the illuminating apparatus has a mask element provided with a positioning pattern corresponding to the positioning mark;

(1-6) a stereoscopic image display apparatus comprising: an illuminating apparatus in which an illumination light source and an optical system are housed in a housing, the optical system being arranged to change light from the illumination light source to patterned beams by a mask element consisting of plural aperture portions and shield portions arrayed at predetermined pitch in a horizontal direction and in a vertical direction and to guide the patterned beams with directivity by a microlens element; and a transmissive image sheet in which a stripe composite image produced by dividing a plurality of parallax images into stripes and arranging the stripes in a predetermined order is provided on a surface of a transparent sheet; wherein the transmissive image sheet is detachably mounted on the housing and the stripe composite image illuminated by the light from the illuminating apparatus is observed as a stereoscopic image, and wherein the transmissive image sheet is provided with a positioning mark for positioning relative to the illuminating apparatus.

Particularly, (1-6-1) the illuminating apparatus has a mask element provided with a positioning pattern corresponding to the positioning mark.

In addition, in the configuration (1-2), (1-4), or (1-6), (1-6-1) the stripe composite image is a horizontal stripe composite image obtained by dividing a plurality of parallax images into horizontal stripes which are a predetermined number of horizontal lines arrayed in the vertical direction and arranging the horizontal stripes in a predetermined order;

(1-6-2) the microlens element has a vertical cylindrical lens array comprising a lot of vertical cylindrical lenses having refracting power in the horizontal direction and extending in the vertical direction, wherein a beam outgoing from a point on a mask aperture of a mask pattern formed on the mask element is converted to a nearly parallel beam in the horizontal direction by the vertical cylindrical lens array;

(1-6-3) the microlens element comprises a vertical cylindrical lens array comprising a lot of vertical cylindrical lenses having refracting power in the horizontal direction and extending in the vertical direction, and a horizontal cylindrical lens array comprising a lot of horizontal cylindrical lenses having refracting power in the vertical direction and extending in the horizontal direction, wherein a beam outgoing from a point on a mask aperture of a mask pattern formed on the mask element is converted to a nearly parallel beam in the horizontal direction by the vertical cylindrical lens array and is converted to a converging beam in the vertical direction by the horizontal cylindrical lens array;

(1-6-4) the microlens element comprises a toric lens array comprising a lot of toric lenses arrayed in the horizontal and vertical directions, the toric lenses having refracting power in the horizontal direction and refracting power in the vertical direction different from each other, and wherein a beam outgoing from a point on a mask aperture of a mask pattern formed on the mask element is converted to a nearly parallel beam in the horizontal direction by the toric lens array and is converted to a converging beam nearly converged at a position of a surface of the transmissive image sheet in the vertical direction by the toric lens array;

(1-6-5) the mask element is a transmissive display device and wherein the display device adjusts an array of the mask pattern consisting of the aperture portions and shield portions. Particularly, the array of the mask pattern consisting of the aperture portions and shield portions, displayed by the display device, is variable based on a signal from the outside, the stereoscopic image display apparatus having changeover means for performing changeover between a mode in which the variable array of the mask pattern consisting of the aperture portions and shield portions is dynamically displayed based on an external signal and a mode in which the array of the mask pattern is fixed in a predetermined state.

A transmissive image sheet of the present invention is:

(2-1) a transmissive image sheet in which a stripe composite image in which a plurality of stripe parallax images of a stripe shape are arrayed at predetermined repetition pitch are provided on a surface of a transparent sheet, the transmissive image sheet having a positioning mark for positioning the transmissive image sheet relative to an illuminating apparatus when the transmissive image sheet is detachably mounted on the illuminating apparatus, the illuminating apparatus being arranged to illuminate the transmissive image sheet to permit the stripe composite image to be observed as a stereoscopic image.

Particularly, (2-1-1) the stripe composite image is a horizontal stripe composite image obtained by dividing a plurality of parallax images into a predetermined number of horizontal stripes being horizontal lines arrayed in a vertical direction and arranging the horizontal stripes in a predetermined order.

An illuminating apparatus of the present invention is:

(3-1) an illuminating apparatus for illuminating a transmissive image sheet by light with predetermined regularity, the transmissive image sheet being one in which a stripe composite image obtained by arraying a plurality of stripe parallax images of a stripe shape at predetermined repetition pitch is provided on a surface of a transparent sheet, the illuminating apparatus being arranged to observe the stripe composite image as a stereoscopic image while illuminating the transmissive image sheet, wherein the illuminating apparatus has a positioning mark or positioning means for positioning the illuminating apparatus relative to the transmissive image sheet when the transmissive image sheet is detachably mounted thereon.

An image processing method of the present invention is an image processing method for producing a transmissive image sheet by forming on a surface of a transparent sheet a stripe composite image produced by dividing a plurality of parallax images into stripes and arranging the stripes in a predetermined order, and a positioning mark for positioning the transmissive image sheet relative to an illuminating apparatus when the transmissive image sheet is detachably mounted on the illuminating apparatus, the illuminating apparatus being arranged to illuminate the stripe composite image to observe the stripe composite image as a stereoscopic image, wherein the image processing method comprises a process of combining image data of the stripe composite image with image data of the positioning mark to produce one image data.

As described above, the present invention can achieve the stereoscopic image display apparatus that permits the observer to observe the good stereoscopic image without a glare of the screen and that permits the observer to observe plural stereoscopic images readily and in a good state with saving the time and labor for production of image, by properly arranging the transmissive image sheet having the stripe composite image and the illuminating apparatus for illuminating the transmissive image sheet, and can also achieve the transmissive image sheet and illuminating apparatus used therein.

Further, the configurations of the present invention make it possible to provide the stereoscopic image display method and apparatus that can present a good view of stereoscopic image with preventing the glare on the surface of screen and enable to appreciate the stereoscopic still image without the need for integral formation of the parallax image with the optical system such as the lenticular lens sheet, thereby providing the stereoscopic image display method and stereoscopic image display apparatus that can save the time and labor for production of image.

DETAILED DESCRIPTION OF THE PREFERRED EMBODIMENTS

Figure 1:
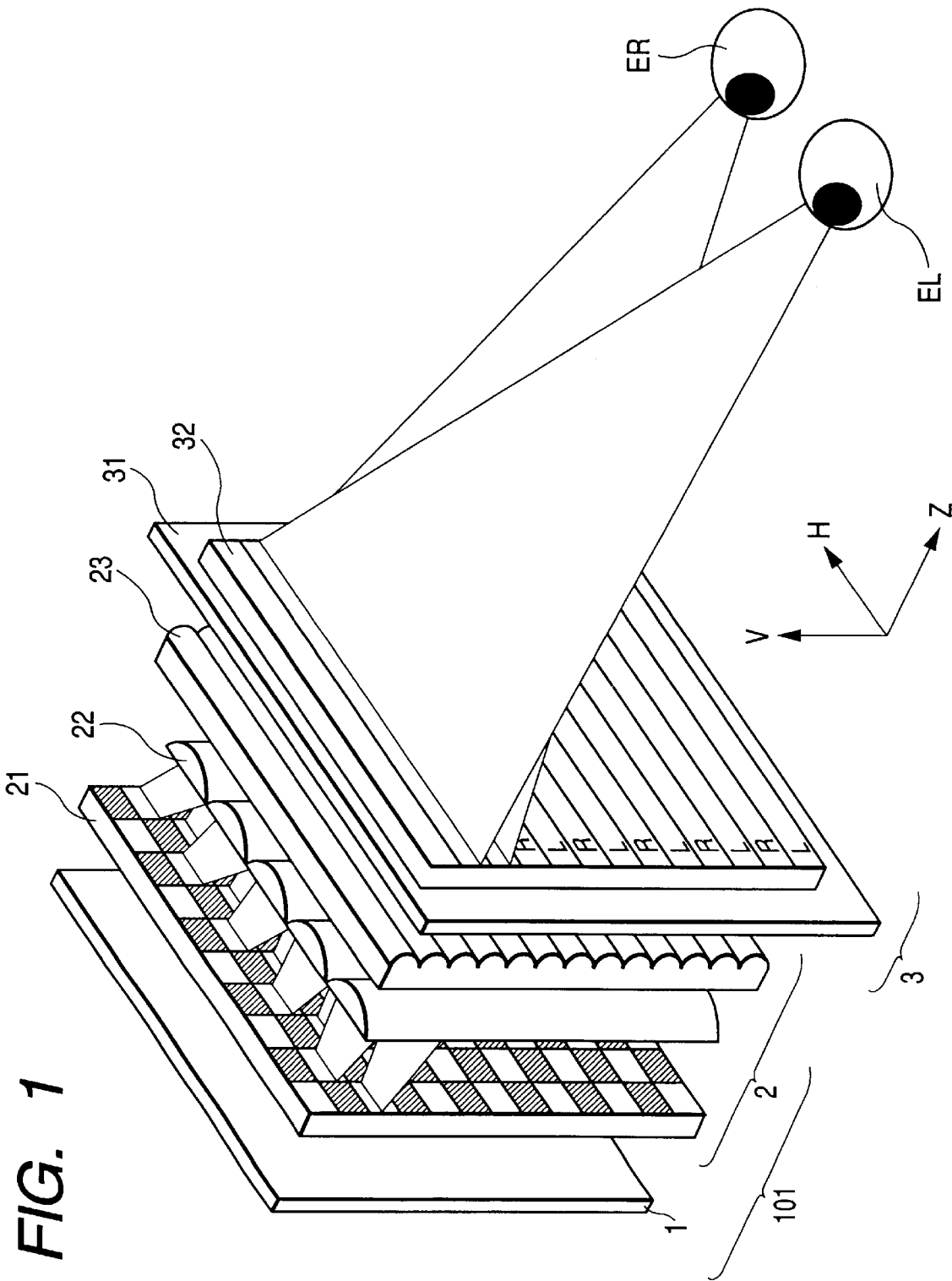
FIG. 1 is a perspective view to show the structure of the major part of a stereoscopic image display apparatus in Embodiment 1 of the present invention.

FIG. 1 is a perspective view to show the major part of Embodiment 1 of the stereoscopic image display apparatus (display device) according to the present invention. In the drawing reference numeral 1 designates a surface illuminant (an illumination light source, which will also be referred to as a "light source") used as a light source for backlight, which is composed of a cold cathode fluorescent tube, an acrylic light guide plate, and so on. Numeral 2 denotes an optical system to guide light from the light source 1 to predetermined positions with predetermined regularity and directivity of light.

In the present embodiment the optical system 2 is composed of a mask element 21 with a mask pattern in which predetermined aperture portions and shield portions are formed of a metal evaporated film of chromium or the like or a light absorbing material in a predetermined sequence (a checkered pattern) on a substrate of glass, resin, or the like, a vertical cylindrical lens array 22 comprised of many vertical cylindrical lenses having refracting power in right-and-left directions (horizontal directions) H and extending vertically, for giving predetermined directivity to beams passing through the aperture portions of the mask element 21, and a horizontal cylindrical lens array 23 comprised of many horizontal cylindrical lenses having refracting power in up-and-down directions (vertical directions) V and extending horizontally.

Each of the vertical cylindrical lens array 22 and the horizontal cylindrical lens array 23 is an element of a microlens element. The light source 1 and optical system 2 are fixed to a housing described below, thereby composing an illuminating apparatus 101. In the drawing numeral 3 denotes a transmissive image sheet, which has a transparent sheet 31 such as an OHP sheet, and a horizontal stripe combined image (composite image) 32 in which plural (for example, two) horizontally striped parallax images are combined in repetitive patterns at predetermined pitch on the surface of the transparent sheet 31, using transmissive ink or the like.

The transmissive image sheet 3 is detachably mounted in the illuminating apparatus 101 as described hereinafter. The vertical cylindrical lens array 22 and horizontal cylindrical lens array 23 may be arranged in an arbitrary order between the mask element 21 and the transmissive image sheet 3 without having to be limited to the order illustrated. EL and ER represent the left eye and right eye of an observer.

Figure 2:
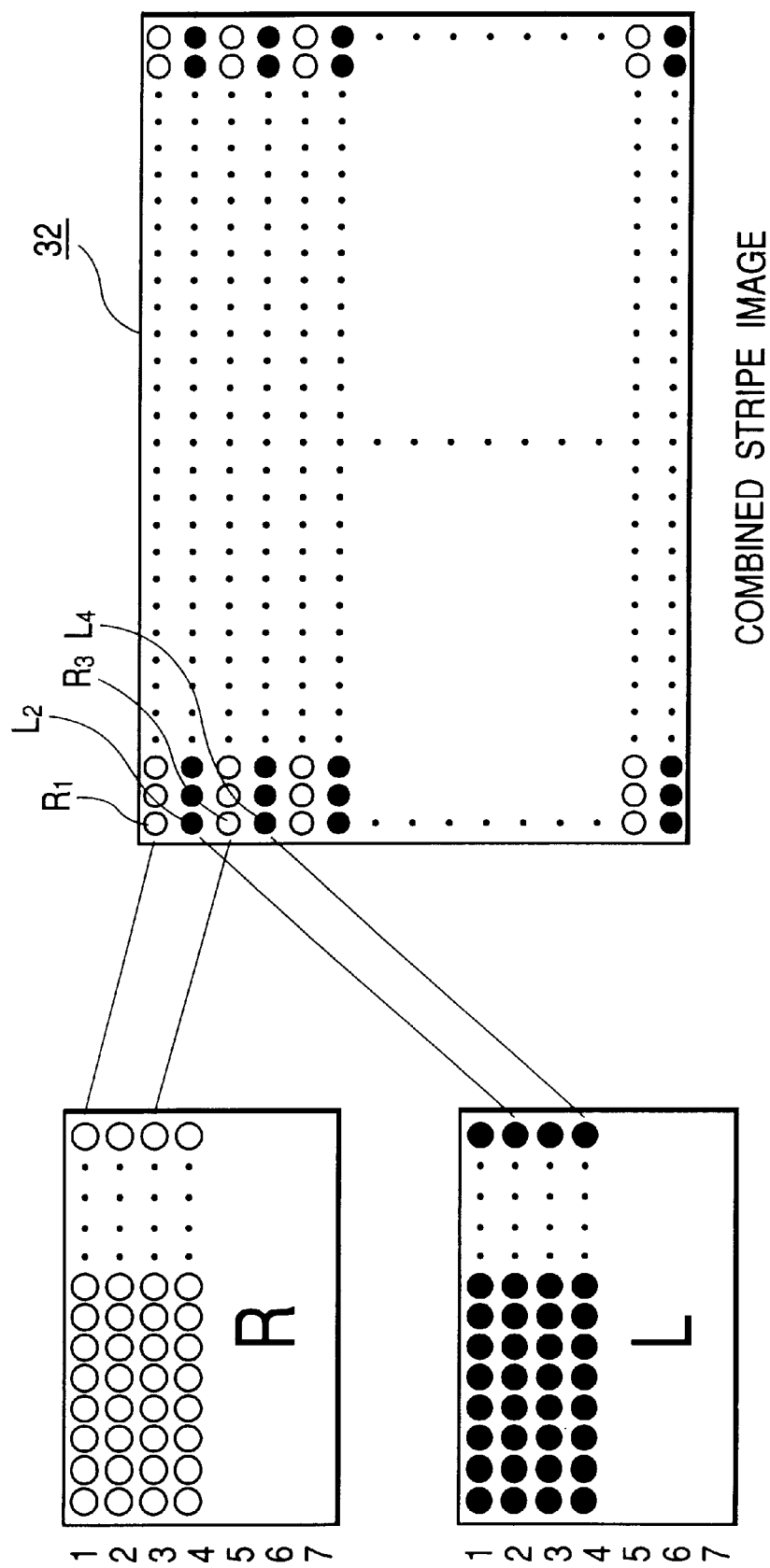
FIG. 2 is an explanatory drawing to show a combining method of composite image in Embodiment 1.
Figure 3:
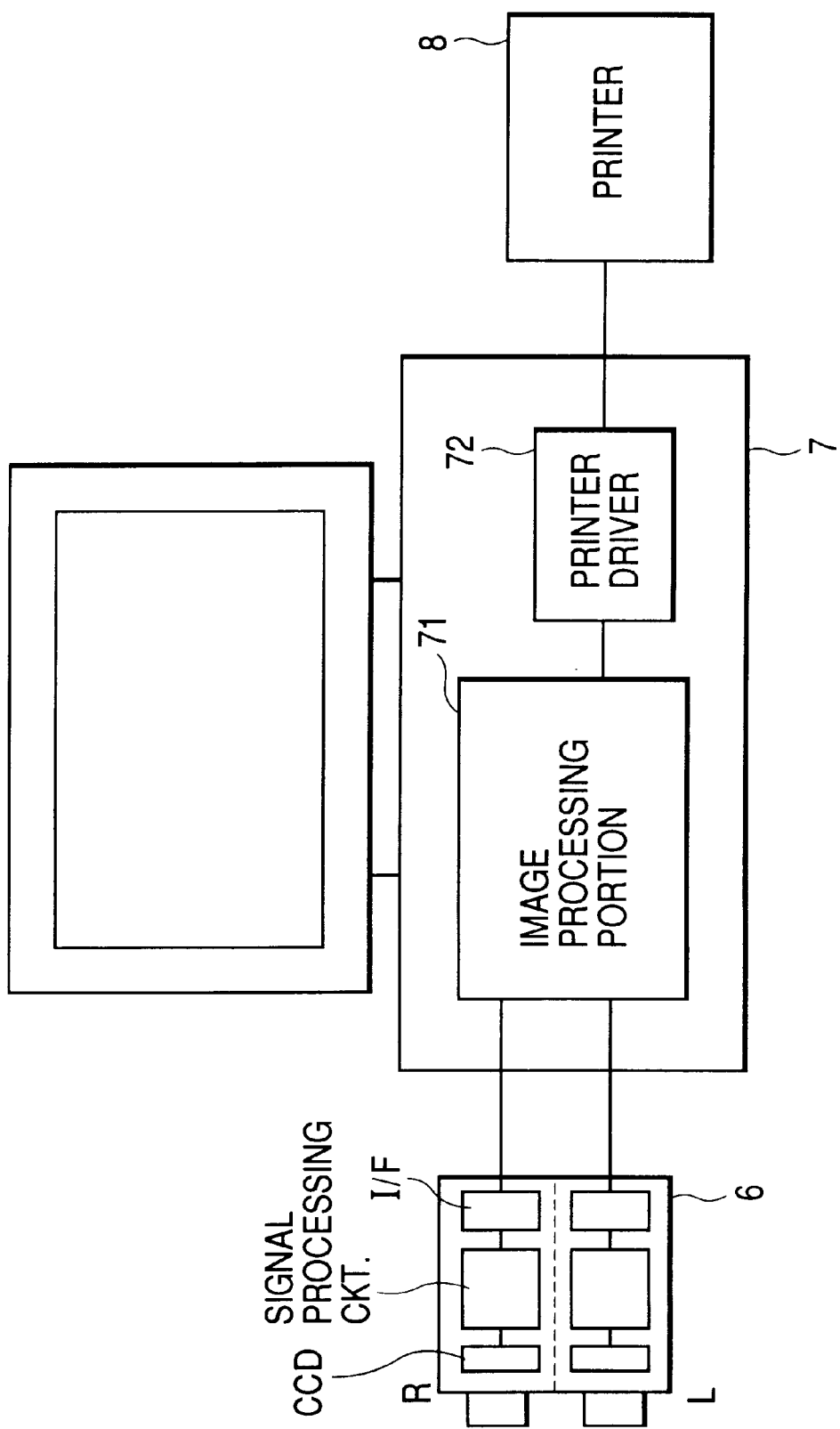
FIG. 3 is a schematic view to show the structure of an apparatus used for formation of the transmissive image sheet of the present invention.

FIG. 2 is an explanatory drawing to illustrate a combining method of a combined image of horizontal stripes (a composite image) in the present embodiment. FIG. 3 is a schematic view of the structure of an apparatus for producing the combined stripe image in the present embodiment. Now, the combined stripe image and the combining method thereof in the present embodiment will be described using the drawings.

Two parallax images R and L, picked up by a stereo camera 6 having two CCD cameras shown in FIG. 3, are sent through a CCD, a signal processing circuit, etc. to computer 7 to be put in parallel into an image processing portion 71. The image processing portion 71 splits each of the two parallax images R and L into a plurality of horizontal stripe parallax images (lines) in the width of one pixel of the CCDs in the vertical directions, as shown in FIG. 2.

Then the stripe parallax images (stripe pixel lines) (R1, R2, . . . ) produced from the right parallax image R and the stripe parallax images (stripe image lines) (L1, L2, . . . ) produced from the left parallax image L are alternately arranged every other line, and one horizontal stripe combined image is made by combining the right stripe parallax image R1, left stripe parallax image L2, right stripe parallax image R3, . . . in this order. The one stripe combined image thus made is sent through printer driver 72 to printer 8 to form stripe combined image 32 on the transparent sheet 31 such as the OHP sheet. The transmissive image sheet 3 of FIG. 1 is formed as described above.

The above description concerned the method for making a composite image from two parallax images R, L picked up by the stereo camera, but, without having to be limited particularly to this example, two CG images with parallax or the like produced by a computer or the like may also be applied. A plurality of parallax images more than two may also be used.

The vertical width of each stripe parallax image is not limited to the width of one pixel of CCD, either. Another applicable method is one for splitting the parallax images into horizontal stripe parallax images in the width of each stripe parallax image being a width of plural pixels and combining the stripe parallax images produced from the right parallax image R with the stripe parallax images produced from the left parallax image L by alternately arranging them every other line to produce one horizontal stripe combined image (composite image).

The principle of stereoscopy in the present embodiment will be described below referring to FIG. 4.

Figure 4:
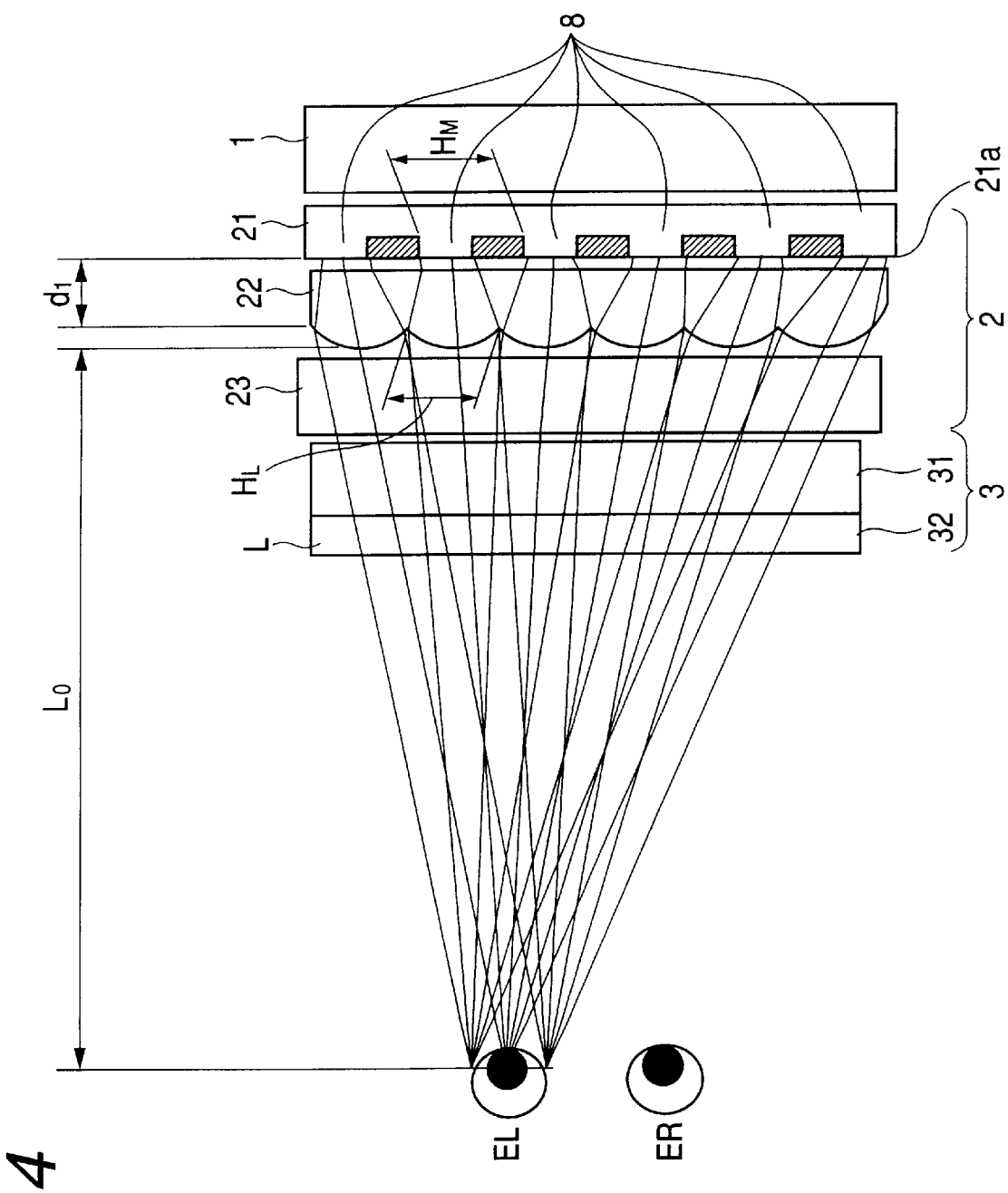
FIG. 4 is a horizontal cross-sectional view of the optical system for explaining the principle of stereoscopy.

FIG. 4 is a horizontal, cross-sectional view of the stereoscopic image display apparatus of the present embodiment, which is an explanatory drawing for explaining the principle where the left and right stripe parallax images are visually recognized as horizontally separated by the observer's eyes EL, ER.

In the drawing, the aperture portions are given nothing and the shield portions are denoted by black marks in the mask pattern 21a of the mask element 21.

The mask element 21 is illuminated by the surface illuminant 1 and the light emerges from the aperture portions thereof. The curvature of the vertical cylindrical lens array 22 is designed so that the surface of the mask pattern 21a of the mask element 21 is located nearly at the focus position of each of the vertical cylindrical lenses composing the array. In this case, since each of the cylindrical lenses composing the horizontal cylindrical lens array 23 does not optically act in this cross section, the light emerging from the aperture portions of the mask element 21 is subject to only the optical action of the vertical cylindrical lens array 22 to be converted into nearly parallel beams. FIG. 4 shows a case wherein the system is designed so that the nearly parallel beams pass through the left parallax image L formed on the transparent sheet 31 to be converged near the observer's left eye EL located at the predetermined position, whereby the left parallax image L is recognized as an image by only the observer's left eye EL.

Describing in more detail, the system is designed so that the following relation is satisfied:

$$L0:(L0+d1)=H_L:H_M \quad (1)$$

where $H_M$ is the horizontal pitch of a pair of aperture portions and shield portions of the mask pattern 21a, $H_L$ is the horizontal lens pitch of the vertical cylindrical lens array 22, L0 is a distance from the predetermined position of the observer to the observer-side principal plane of the vertical cylindrical lens array 22, and d1 is a distance from the mask pattern 21a to the principal plane of the vertical cylindrical lens array 22 on the mask element 21 side. This makes the beams converge near the observer's left eye EL uniformly across the entire horizontal width of the composite image 32.

In an adjacent image line in the normal direction to FIG. 4, the aperture portions and shield portions of the mask pattern 21a of the mask element 21 are reversed, so that the light emerging from the aperture portions of the mask element 21 is converged near the right eye ER through the right parallax image line R formed on the transparent sheet 31.

Accordingly, the composite image 32 formed on the transparent sheet 31 shown in FIG. 1 is recognized by only one of the left and right eyes corresponding to each line in the horizontal direction.

Figure 5:
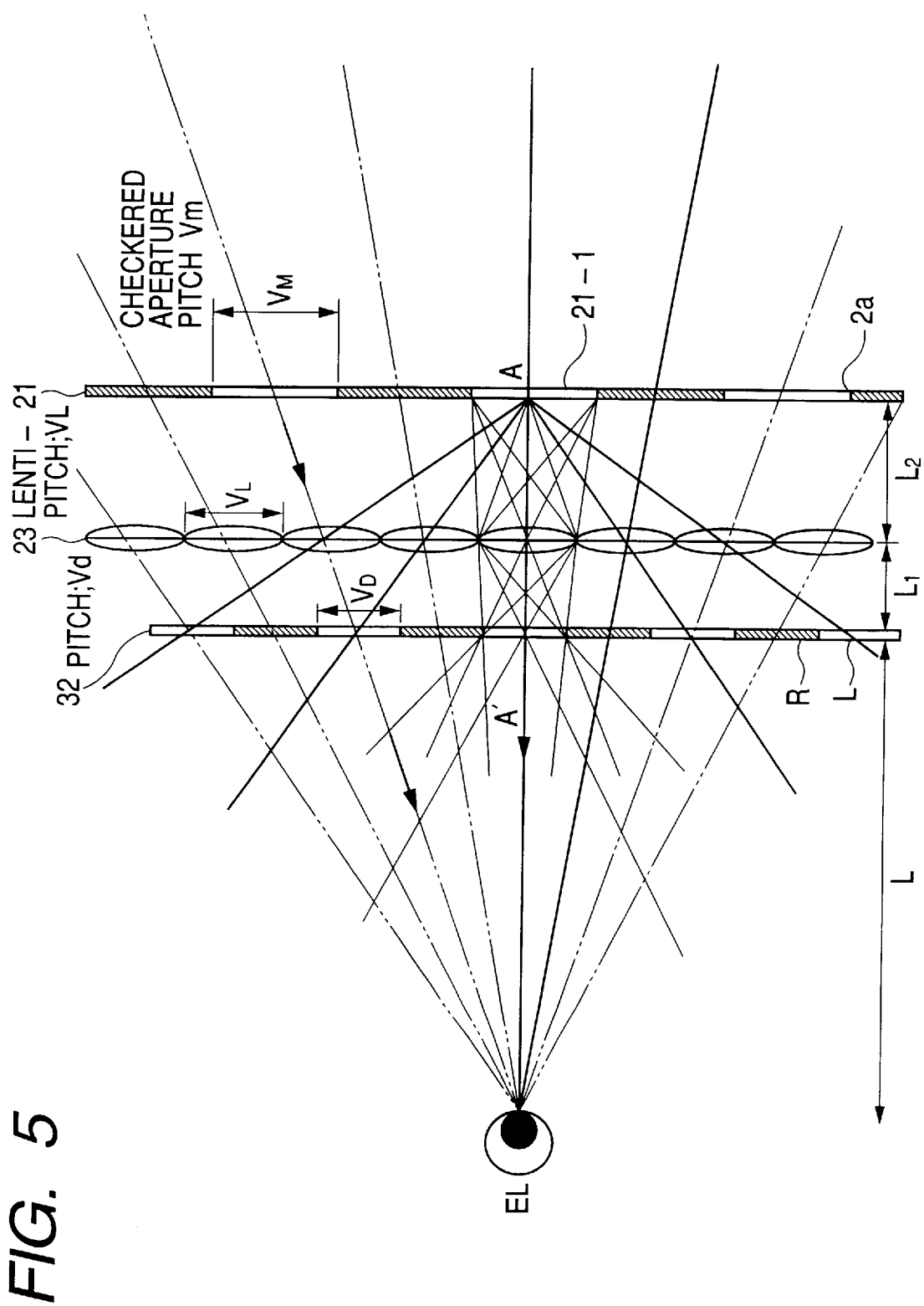
FIG. 5 is a vertical cross-sectional view of the optical system for explaining the principle of stereoscopy.

FIG. 5 is a vertical, cross-sectional view of the stereoscopic image display apparatus of the present embodiment, which shows a state of image recognition in the vertical direction. For brevity of illustration, FIG. 5 is illustrated in such a manner that the mask element 21 is represented by black bars of the shield portions and white bars of the aperture portions of the mask pattern 21a, the vertical cylindrical lens array 22 having no optical action in this cross-sectional direction is omitted, and the horizontal cylindrical lens array 22 is schematically illustrated. In FIG. 5, portions through which the light converging to the left eye EL passes form the aperture portions of the mask pattern 21a and the composite image 32 is illustrated as omitting the transparent sheet 31 so that the corresponding left parallax image lines L are represented by white bars while the right parallax image lines R by black bars.

Here, let $V_M$ be the vertical width of the aperture portions of the mask element 21 (the vertical width of the shield portions is also $V_M$ herein), $V_L$ be the vertical pitch of the horizontal cylindrical lens array 23, fv be the vertical focal length of each cylindrical lens forming the horizontal cylindrical lens array 23, $V_D$ be the pitch of the image lines of the composite image 32, L be a distance from the predetermined position of the observer to the composite image 32, L1 be a distance from the composite image 32 to the observer-side principal plane of the horizontal cylindrical lens array 23, and L2 be an optical distance from the principal plane of the horizontal cylindrical lens array 23 on the mask element 21 side to the mask pattern 21a. Then the following relations are to be satisfied.

$$V_D:V_M=L1:L2 \quad (2)$$

$$V_D:V_L=(L1+L2)/2:L2 \quad (3)$$

$$1/fv=1/L1+1/L2 \quad (4)$$

When the above relations are satisfied, the light emerging from the aperture portions of the mask element 21 is focused on a corresponding line (white portions) of the composite image 32 in the vertical direction by each cylindrical lens and spreads therefrom according to the vertical NA of each cylindrical lens, whereby the vertical observation area of a specific width is assured at the predetermined position of the observer. Since the light passing this line has the directivity to the left eye because of the unillustrated vertical cylindrical lens array 22 in FIG. 4 as described previously, the light spreading according to the vertical NA of each cylindrical lens constituting the horizontal cylindrical lens array 23 is incident to only the left eye EL at the predetermined position of the observer.

Particularly, this example is set to satisfy the following relation.

$$V_D:V_M=L:(L+L1+L2) \quad (5)$$

This causes the light from the center of each aperture of the mask element 21 to pass the center of a corresponding stripe parallax image of the composite image 32 and then to be converged at the predetermined position of the observer, thereby achieving a good observation circumstance across the entire vertical width of the composite image 32.

Accordingly, the light from the surface illuminant 1 illuminates the all vertically distributed left stripe parallax images L1, L2, . . . of the composite image 32 and is incident to only the left eye EL at the predetermined position of the observer, thus assuring the image observation area for the left eye.

Similarly, the illumination light from the reversed pattern of the aperture portions and shield portions of the mask element 21 in FIG. 5 illuminates the all vertically distributed right stripe parallax images R1, R2, . . . of the composite image 32 and converges at the right eye ER, thus assuring the observation area of the specific width in the vertical direction.

The beams respectively illuminating the left stripe parallax images L1, L2, . . . and the right stripe parallax images R1, R2, . . . on the composite image 32 are guided to the areas each at the predetermined position and with the predetermined vertical and horizontal widths in the above-stated manner, whereby the stereoscopic display viewing of the composite image 32 can be achieved when the corresponding eyes are placed in the respective areas.

Figure 6:
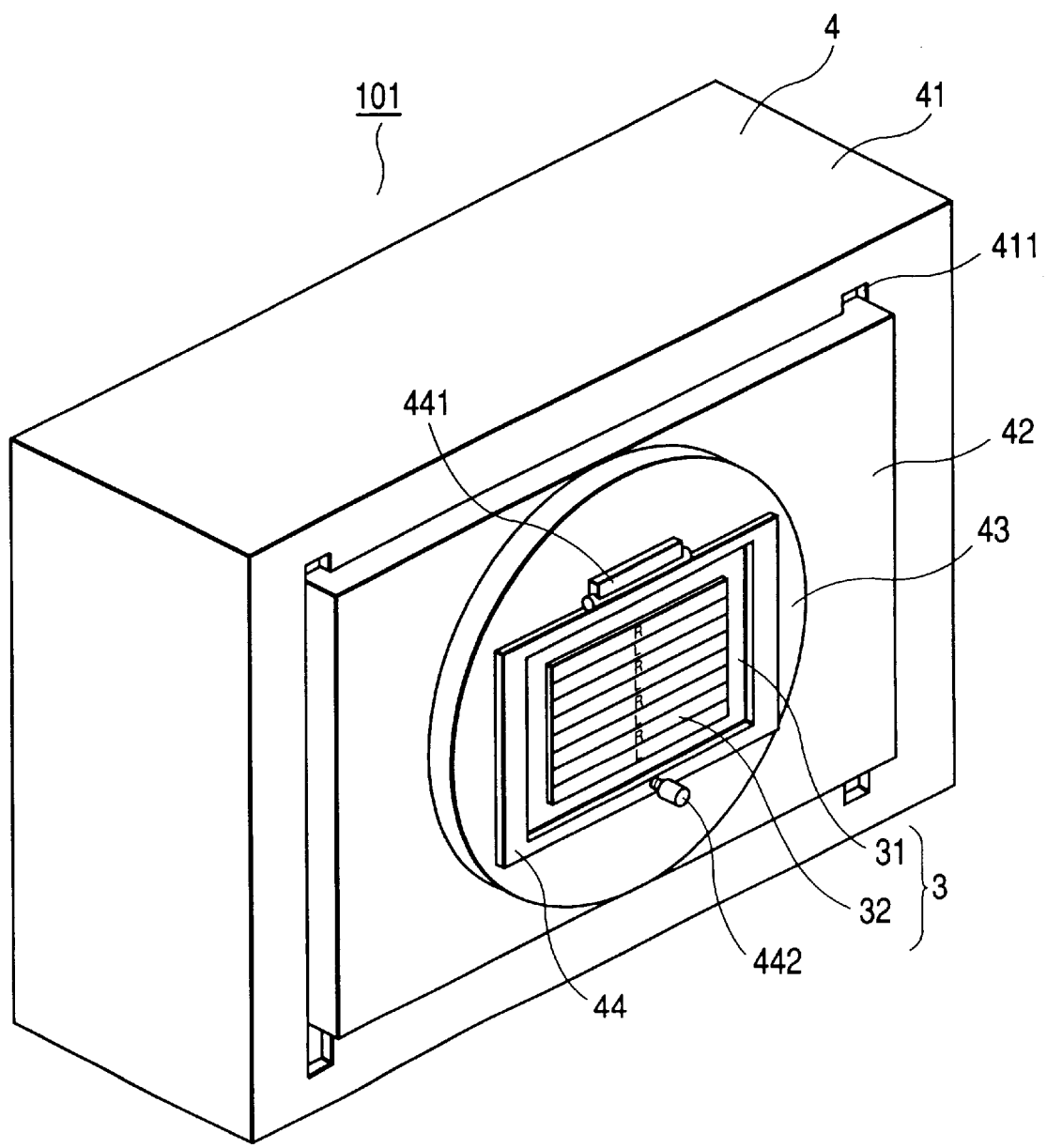
FIG. 6 is a perspective view to show the external view of an illuminating apparatus in Embodiment 1.

FIG. 6 is an external view of the illuminating apparatus 101 incorporating the light source 1 and optical system 2 in the housing 4 in the present embodiment. FIGS. 7A to 7F are explanatory drawings to show components composing the housing 4 of the illuminating apparatus 101 of the present embodiment.

The present embodiment will be described using FIG. 6 and FIGS. 7A to 7F.

Figure 7A:
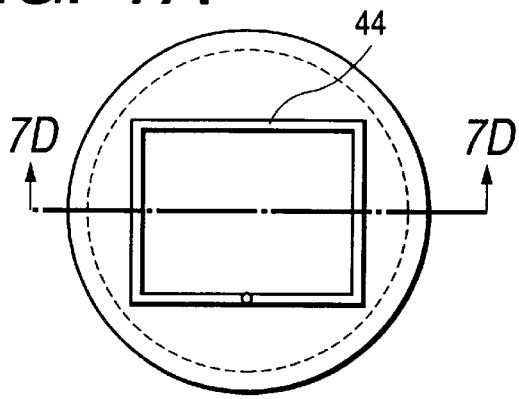
FIGS. 7A, 7B, 7C, 7D, 7E, and 7F are drawings to show components of a housing in the illuminating apparatus of Embodiment 1.
Figure 7D:
Figure 7B:
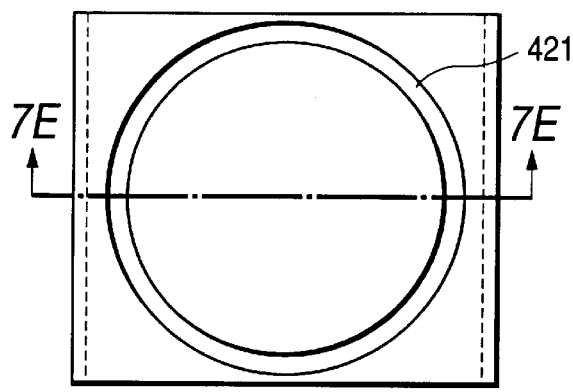
Figure 7E:
Figure 7C:
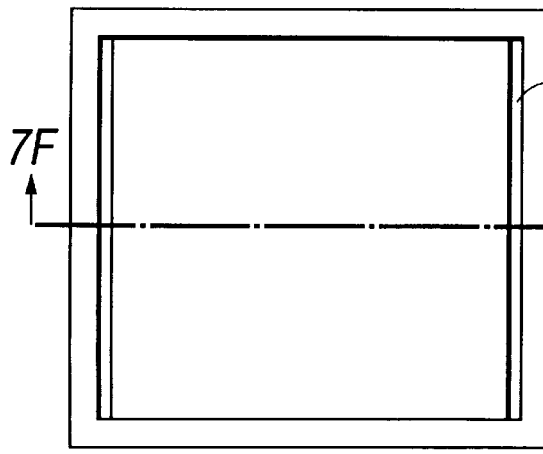
Figure 7F:
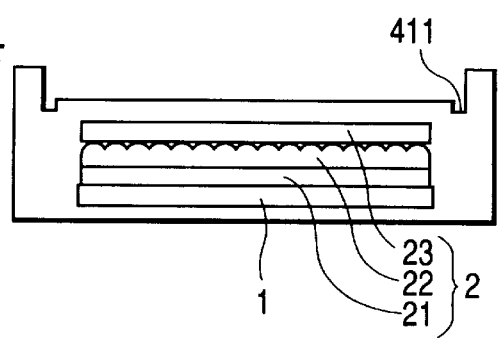

FIGS. 7A to 7C are front elevations of the respective components composing the housing 4 of the present embodiment and FIGS. 7D to 7F are cross-sectional views of the components cut along the line shown in each of FIGS. 7A to 7C. The components composing the housing 4 of the present embodiment are a housing body 41 holding the surface illuminant 1 and optical system 2 inside, a slide frame 42 fitted in slide grooves 411 provided in the housing body 41 and arranged to slide in the up-and-down (vertical) directions (along the V-direction), and a rotary slide frame 43 fitted in a slide groove 421 provided in the slide frame 42 and arranged to rotationally slide therein. The rotary slide frame 43 has a sheet holder (sheet holding portion) 44 of a frame shape having a hinge 441 and a locking screw 442 and the transmissive image sheet 3 described previously is detachably mounted on this portion to achieve a display of stereoscopic still image.

In the present embodiment the housing 4 is arranged to have the mechanisms (411, 421) respectively permitting the vertical and rotational slides of the housing. This allows the observer to adjust the positional relation as follows: the transmissive image sheet 3 is roughly attached to the frame sheet holder 44, the observer adjusts the positional relation between the optical system 2 and the transmissive image sheet 3 while observing the image 32 so as to meet the aforementioned conditions of good stereoscopic image viewing, and the observer locks the respective slide mechanisms when the observer determines that the good circumstance for viewing stereoscopic image is achieved. The slide mechanisms 411, 421, the slide frame 43, etc. compose elements of adjusting means.

Next described are Embodiments 2 to 4 of the present invention. Embodiments 2 to 4 are different from Embodiment 1 only in that after the transmissive image sheet 3 is mounted on the illuminating apparatus 101, positioning between them is carried out using positioning marks so as to achieve the stereoscopic image viewing. Since the structure of the major part and the principle of stereoscopy are the same as in Embodiment 1, only different portions will be described below.

Figure 8A:
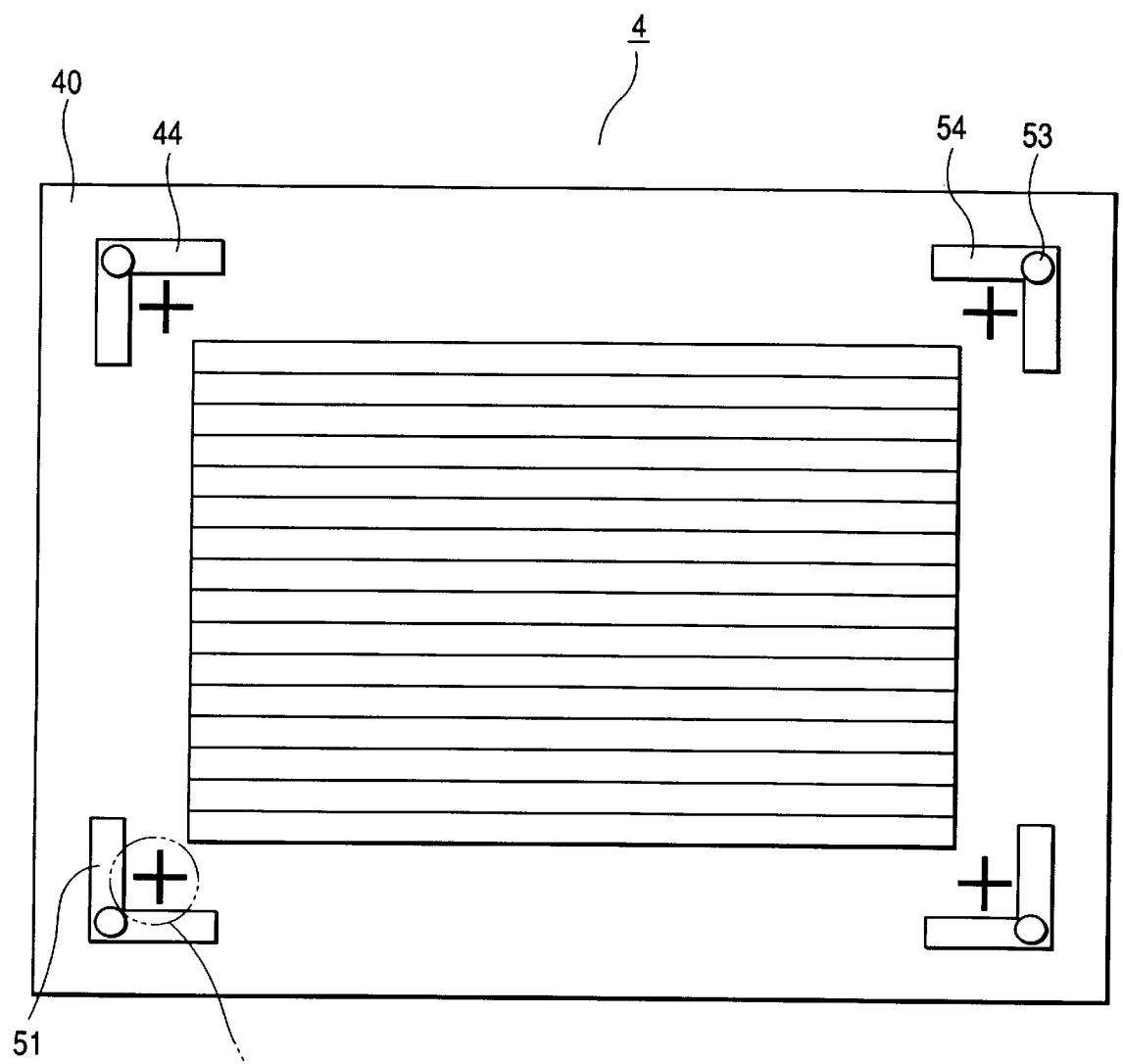
FIGS. 8A and 8B are drawings to show the housing in the illuminating apparatus of Embodiment 2.
Figure 8B:
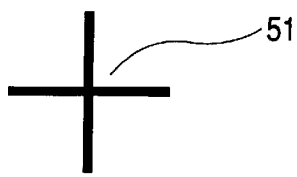
Figure 9A:
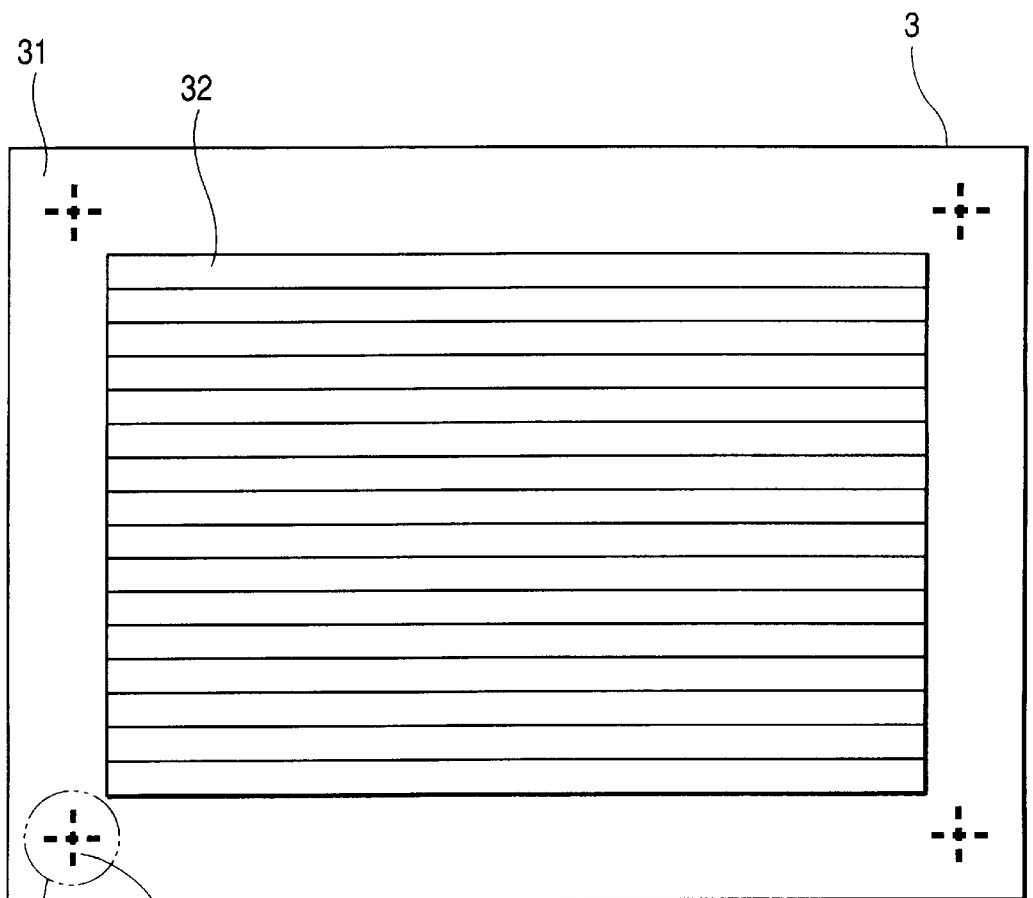
FIGS. 9A and 9B are explanatory drawings to illustrate the transmissive image sheet in Embodiment 2.
Figure 9B:
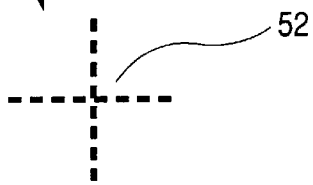

FIGS. 8A and 8B are explanatory drawings of the housing forming the illuminating apparatus of Embodiment 2 and FIGS. 9A and 9B are explanatory drawings of the transmissive image sheet 3 in Embodiment 2. The present embodiment will be described referring to the drawings.

FIG. 8A is a front elevation of the housing 4 in the present embodiment. As illustrated, the housing 4 of the present embodiment has a sheet holding mechanism 44 in the housing body 40 holding the light source 1 and optical system 2 inside, by which the transmissive image sheet 3 described previously is detachably mounted to achieve the display of stereoscopic still image.

In the present embodiment, positioning marks 51 are provided on the housing body 40 and positioning marks 52 on the transparent sheet 31, as positioning images for positional adjustment between the illuminating apparatus 101 and the transmissive image sheet 3. Enlarged views of the respective marks are illustrated in FIG. 8B and FIG. 9B.

FIG. 9A is a front elevation of the transmissive image sheet 3 in the present embodiment. In FIG. 9A, R and L (unshown) represent the right stripe parallax image R and left stripe parallax image L combined in the same way regarding as R and L of the composite image 32 of Embodiment 1 described referring to FIG. 2 and formed on the transparent sheet 31 by use of the means such as the printer.

The transmissive image sheet 3 of the present embodiment is different from the transmissive image sheet 3 of Embodiment 1 in that, as illustrated, as positioning marks for positional adjustment between the illuminating apparatus 101 and the transmissive image sheet 3, the positioning marks 52 corresponding to the positioning marks 51 provided on the aforementioned housing body 40 are formed at places except for the portion where the composite image 32 is formed, on the transparent sheet 31.

FIG. 9B is an enlarged view of a positioning mark 52.

Next described is a method for producing the transmissive image sheet 3 of the present embodiment. The structure of the apparatus used for producing the transmissive image sheet 3 is the same as in FIG. 3 described in Embodiment 1. The two parallax images R, L with parallax picked up by the stereo camera 6 (or produced in the computer) are put into the image processing portion. The image processing portion 71 executes the predetermined image processing and thereafter produces data of one composite image. According to print execution action from the user or the like, the printer driver 72 is started and the composite image data is outputted in a predetermined form to the printer, whereby the composite image 32 is formed on the transparent sheet 31, thus forming the transmissive image sheet 3.

Figure 10:
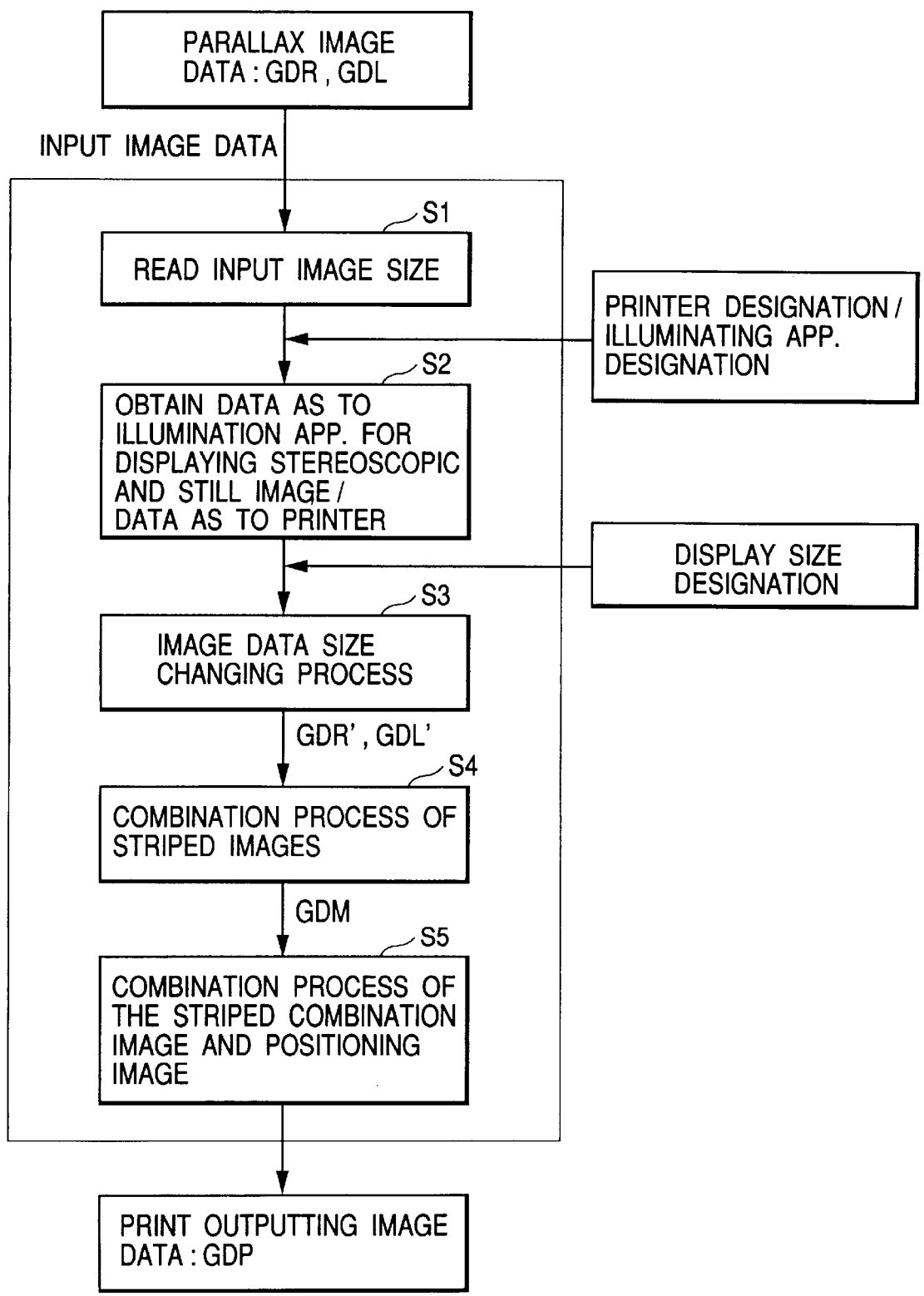
FIG. 10 is a drawing to show a process for production of transmissive image sheet in Embodiment 2.

FIG. 10 is a flowchart to explain the process in the image processing portion 71 of FIG. 3. The processing method in the image processing portion 71 will be described in detail, referring to FIG. 10.

The image processing portion 71 acquires data of an input image size (the number of pixels) from at least one of the two input parallax image data GDR, GDL (step S1).

The processing portion acquires data including the resolution of the printer, the size of the effective illumination portion of the illuminating apparatus, the width of the image lines composing the composite image displayed against the illuminating apparatus, the positioning method between the illuminating apparatus and the transmissive image sheet (the present embodiment is arranged to position the transmissive image sheet 3 to the optical system 2 by the cross positioning marks described above), etc., based on data from the outside, concerning the printer and the illuminating apparatus (step S2).

Then the processing portion receives designation of enlargement/reduction from the outside and changes the size of the two input image data to the display image size upon output to the printer, thus producing two image data for combining process GDR', GDL'. On this occasion, the processing portion carries out the interpolation process, if necessary, according to the ratio of the display image size and the size of input image data and the relation between the resolution of printer and the width of image lines composing the composite image displayed against the illuminating apparatus (step S3).

From the two image data for combining process GDR', GDL' produced in step S3, the processing portion produces one composite image data GDM, based on the image processing method described in Embodiment 1 (step S4).

Based on the data concerning the positioning method between the illuminating apparatus and the transmissive image sheet, acquired in step S2, the processing portion produces positioning image data (the cross positioning marks of dotted line herein) by referring to corresponding template image data or by computation, and produces image data for print GDP by locating the positioning image data at the predetermined positions relative to the composite image data GDM produced in step S4 (step S5).

The image combining process is completed as described above and the image data GDP is sent to the printer. The transmissive image sheet shown in FIG. 9A is produced by carrying out the image combining process based on the above routine.

As also described in Embodiment 1, the parallax image data may be one produced in the computer instead of the parallax image data from the stereo camera.

The above process may be either one carried out on the software basis or one carried out on the hardware basis.

Figure 11A:
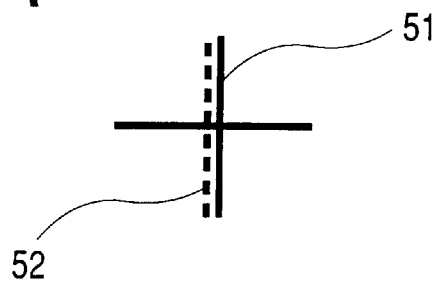
FIGS. 11A, 11B, and 11C are drawings to explain positioning between the transmissive image sheet and the illuminating apparatus in Embodiment 2.
Figure 11B:
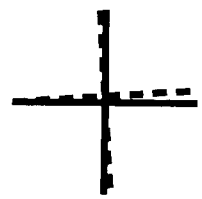
Figure 11C:
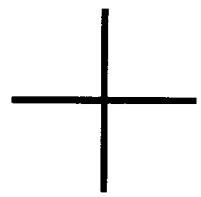

FIGS. 11A to 11C are drawings to explain positioning between the transmissive image sheet 3 and the illuminating apparatus 101 in the present embodiment. FIG. 11A and FIG. 11B show examples of illustration on the way of adjustment and FIG. 11C shows an illustration where the adjustment is done well. As seen from the drawings, since the present embodiment employs such positioning marks that the marks 51 on the housing 4 side are the cross patterns of solid line and the marks 52 on the transmissive image sheet 3 side are the cross patterns of dotted line, success or failure of positioning is easy to confirm.

Figure 12:
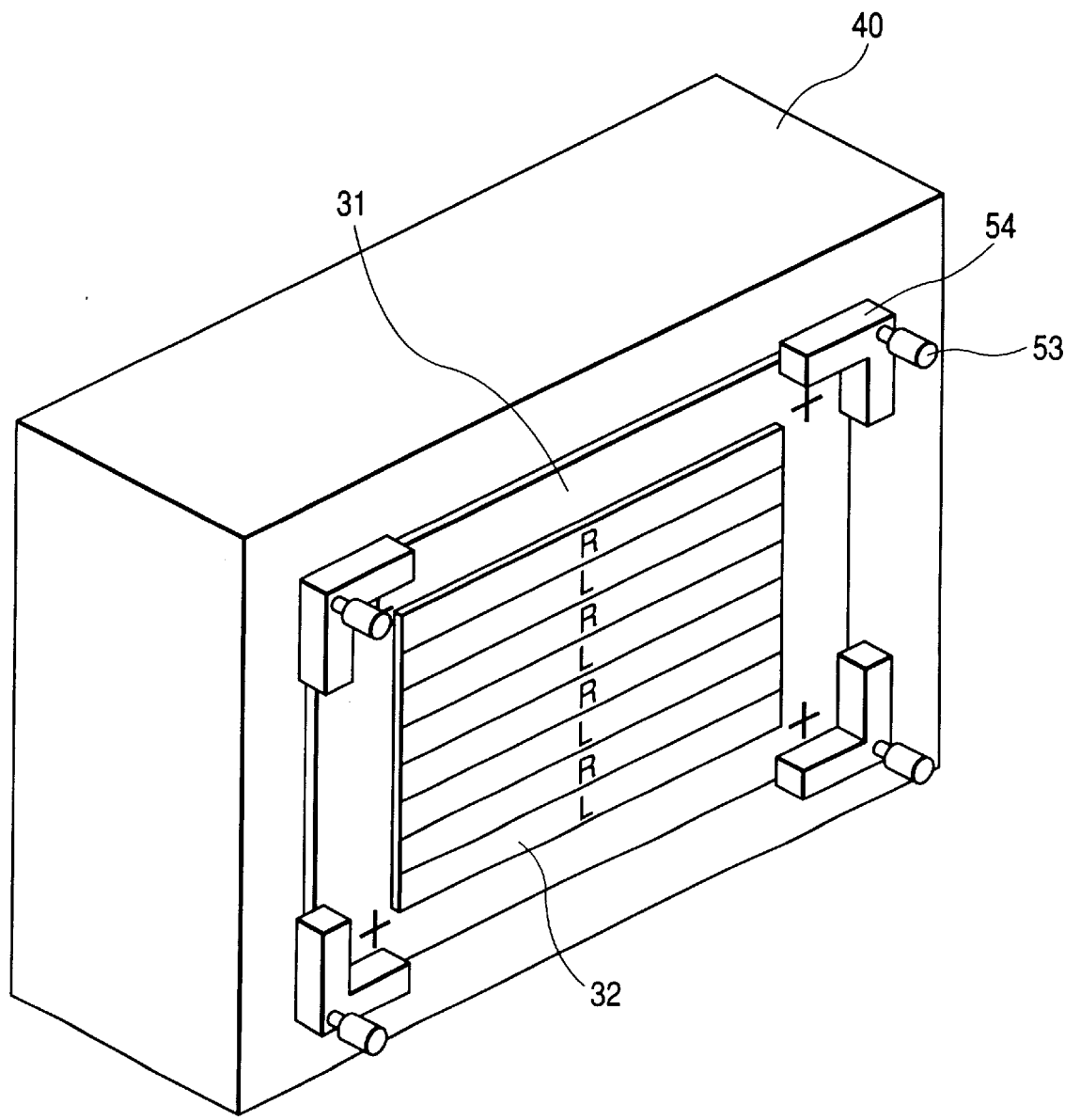
FIG. 12 is a perspective view to show the external view of the illuminating apparatus in Embodiment 2.

FIG. 12 is a perspective view to show the external view of the stereoscopic image display apparatus of the present embodiment.

The housing of the present embodiment is constructed in the structure for holding the transmissive image sheet after the positioning marks 51 and 52 are matched as described above, and is not constructed of plural parts, but is constructed of only the body 40, different from the housing 4 of Embodiment 1. According to the present embodiment, after the positioning marks 51 and 52 are matched, parts of the four corners of the transparent sheet 31 are held by simply tightening screws 53 with respective holders 54. This permits the positional relation between the optical system 2 and the transmissive image sheet 3 to be adjusted independent of observer's subjective evaluation of circumstance of viewing a stereoscopic image, thereby realizing the good display of stereoscopic still image.

Another preferred arrangement not employing the holding method of the transmissive image sheet 3 described above is such that air chucks or electrostatic chucks are used to hold the transmissive image sheet 3 from the back thereof, which is preferred because there is little positional deviation after the matching between the positioning marks 51 and 52 and before the end of holding.

Figure 13A:
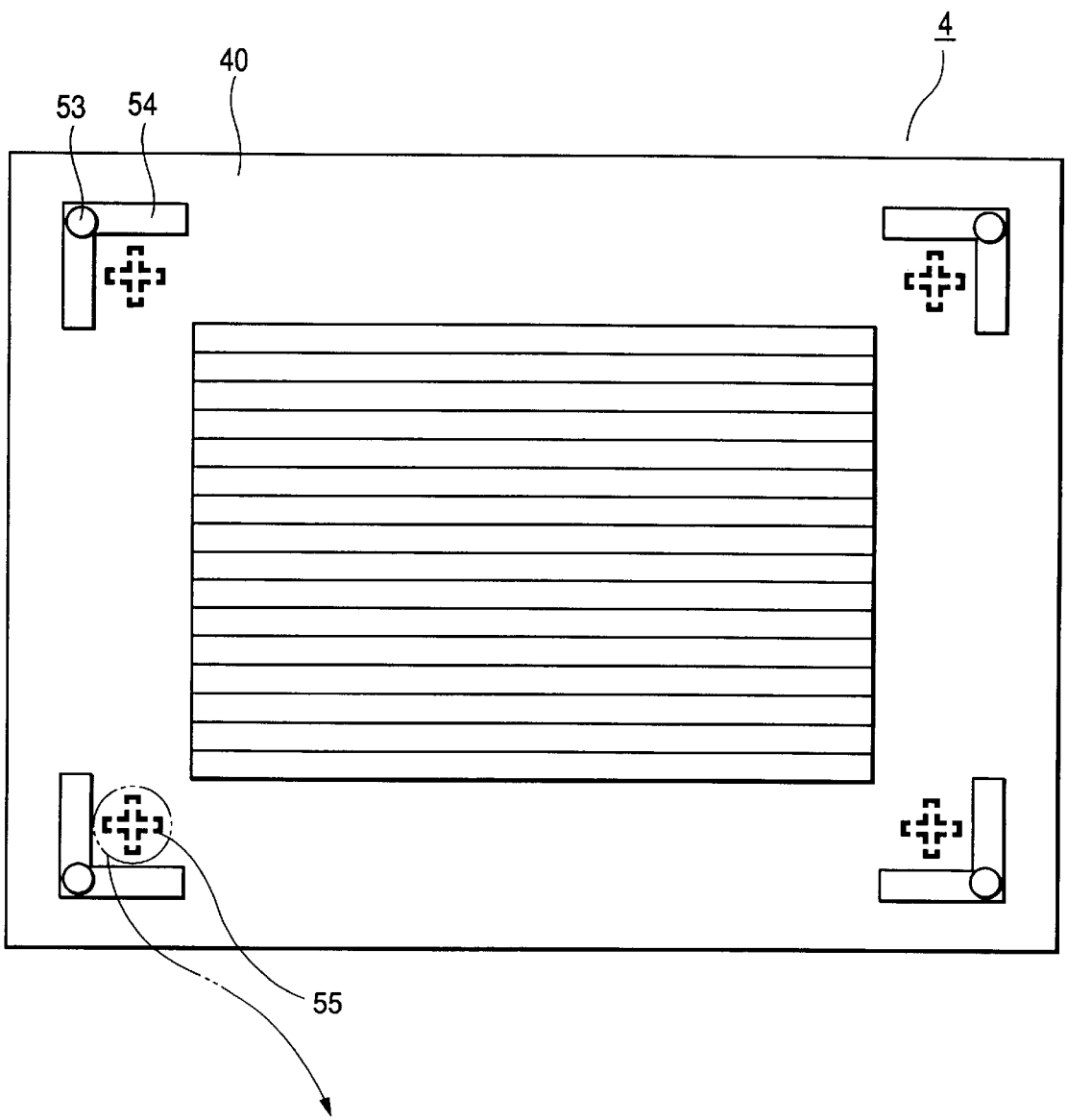
FIGS. 13A and 13B are drawings to show the housing of the illuminating apparatus in a derivative example of Embodiment 2.
Figure 13B:
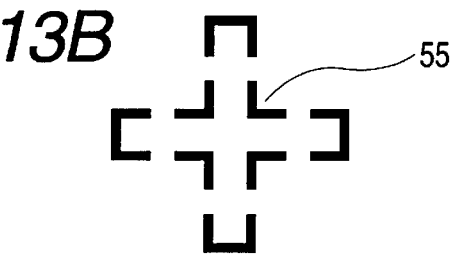
Figure 14A:
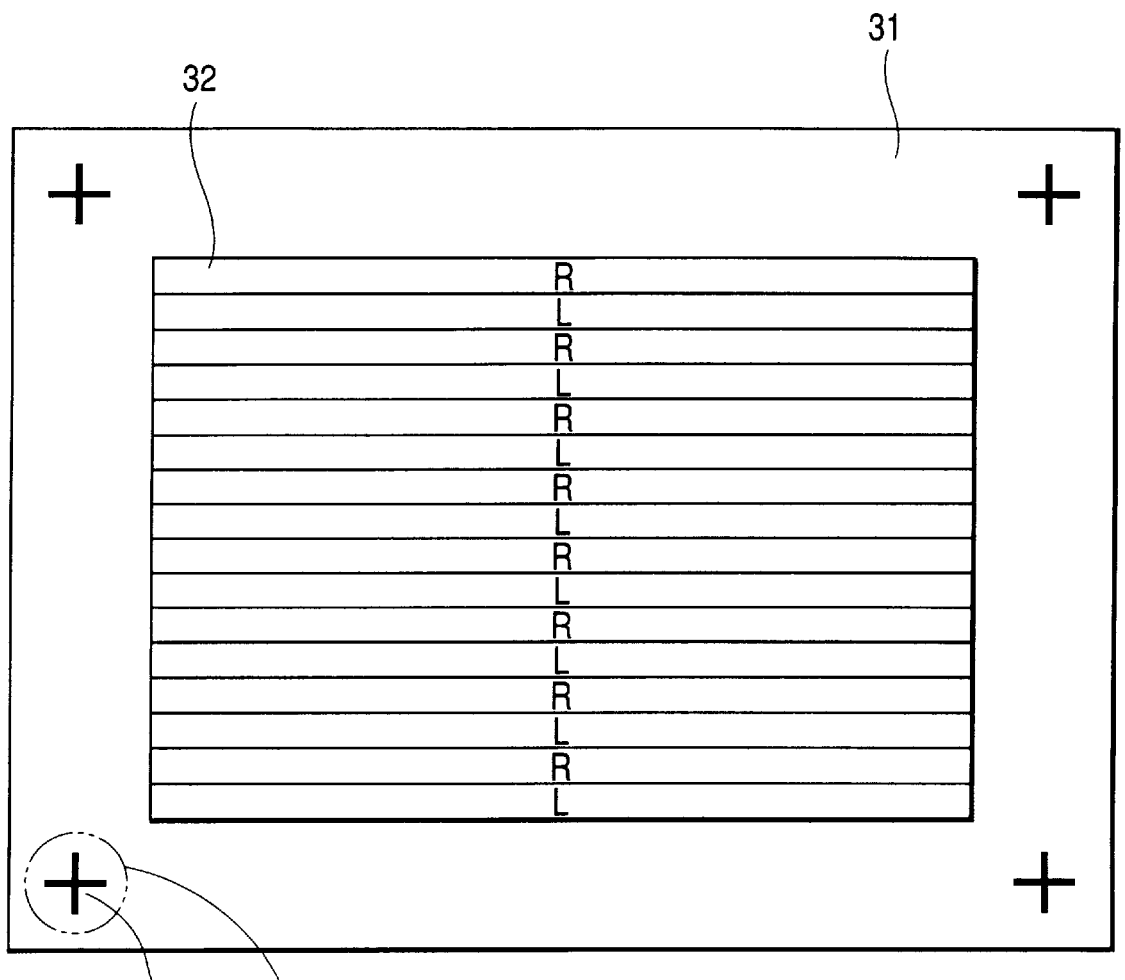
FIGS. 14A and 14B are drawings to show the transmissive image sheet in a derivative example of Embodiment 2.
Figure 14B:
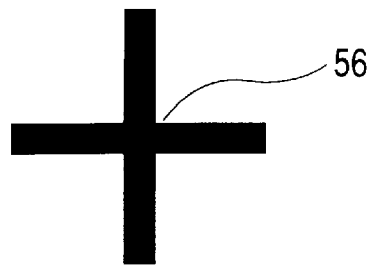

The positioning marks 51, 52 in the present embodiment are not limited specifically to the above-stated patterns. For example, the positioning marks may be such that positioning marks 55 of the pattern shown in FIGS. 13A and 13B are placed on the housing 4 of the display apparatus and positioning marks 56 of the pattern as shown in FIGS. 14A and 14B are placed on the transparent sheet 31. In another example, specific grating patterns are placed on the respective members and positioning is carried out as observing appearing states of moire.

Embodiment 3 of the present invention will be described below referring to FIG. 15 to FIGS. 17A to 17C. The structure of the major part and the principle of stereoscopy in this Embodiment 3 are the same as in Embodiment 1 and thus the description thereof is omitted herein.

Figure 15:
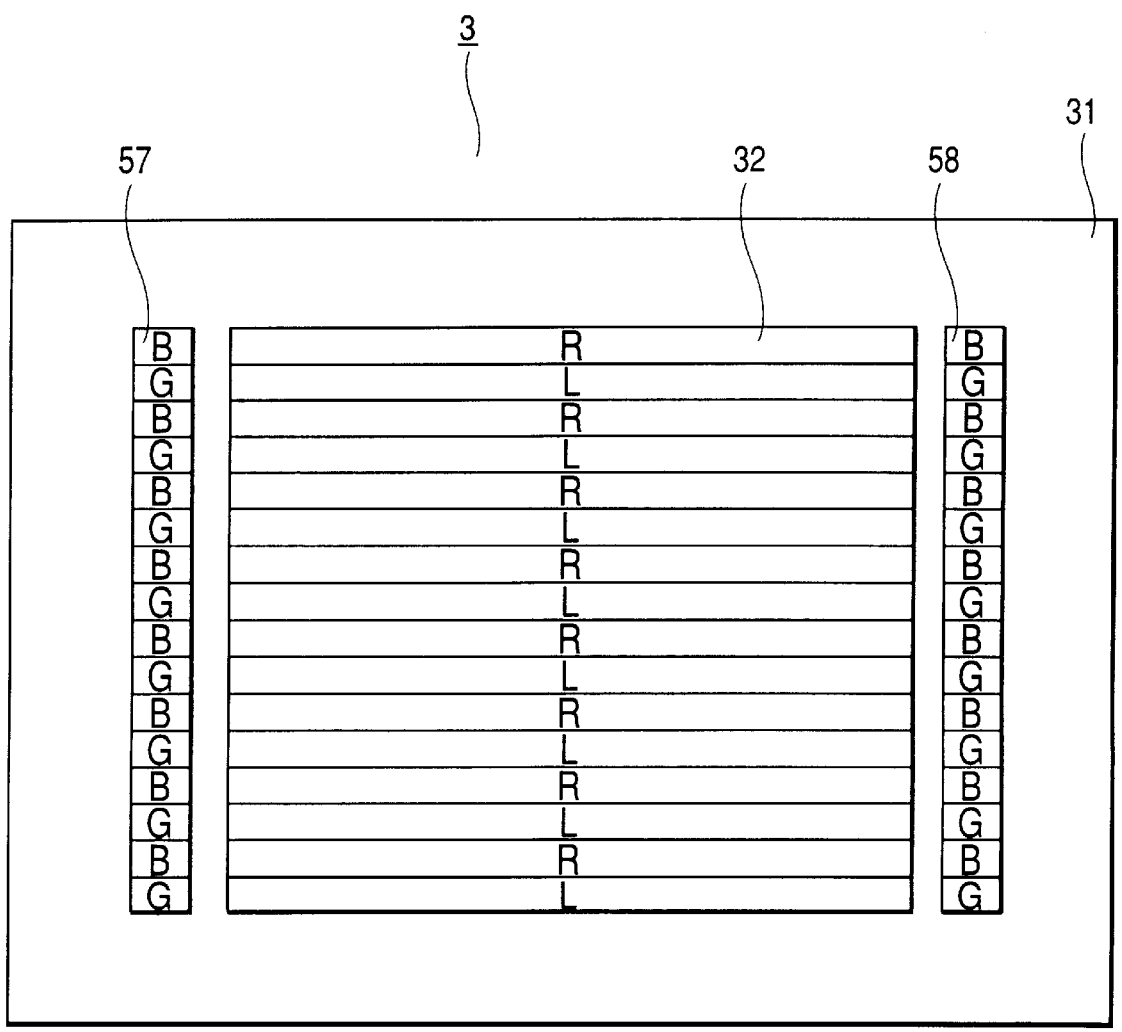
FIG. 15 is an explanatory drawing to illustrate the transmissive image sheet in Embodiment 3.
Figure 16:
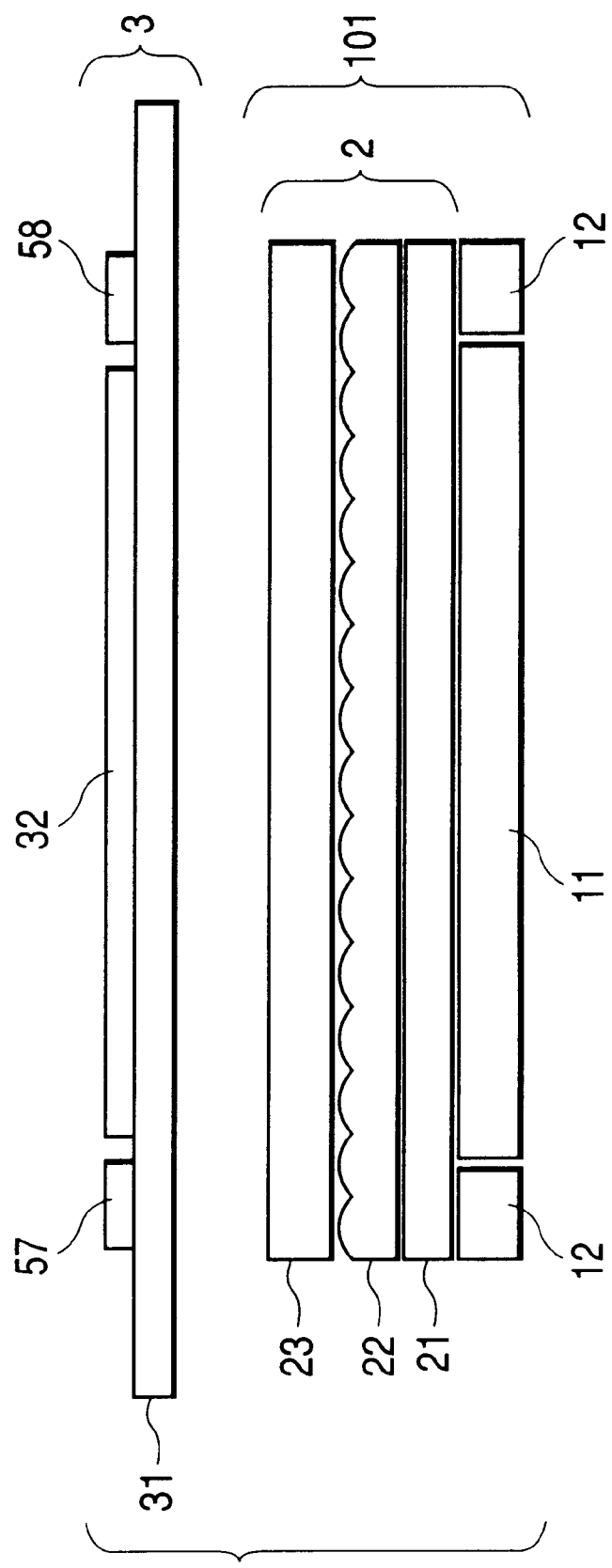
FIG. 16 is an explanatory drawing to illustrate the illuminating apparatus in Embodiment 3.

FIG. 15 is an explanatory drawing of the transmissive image sheet 3 in the present embodiment and FIG. 16 is an explanatory drawing of the display apparatus of the present embodiment. The present embodiment will be described referring to the drawings.

In FIG. 15, R, L represent the right stripe parallax and left stripe parallax images combined in the same manner as the composite image of Embodiment 1 described referring to FIG. 2 and formed on the transparent sheet 31 by use of the means such as the printer. The composite image of the present embodiment is different from that of Embodiment 1 in that as positioning marks for positional adjustment between the illuminating apparatus 101 and the transmissive image sheet 3, positioning marks 57 and 58 of different colors line from line a re formed in the same width as the right stripe parallax images and left stripe parallax images in the vertical direction at the left and right edges of the portion where the composite image is formed. In this example, blue lines B are provided at the both ends of each right stripe parallax image R and green lines G at the both ends of each left stripe parallax image L.

FIG. 16 is an explanatory drawing of the display apparatus of the present embodiment, in which as portions for only positional adjustment between the illuminating apparatus 101 and the transmissive image sheet 3, surface illuminants (positioning means) 12 for positioning to illuminate the portions of the positioning images 57, 58 are provided on the both sides of the surface illuminant 11 for illumination of composite image to illuminate the portion of the composite image 3 formed on the aforementioned transmissive image sheet 3. The surface illuminant 11 for illumination of composite image and the positioning surface illuminants 12 are arranged to be capable of being turned on or off independently of each other.

In the present embodiment the image sheet can also be produced by carrying out the same image process flow as in Embodiment 2, and it is omitted to explain herein.

Figure 17A:
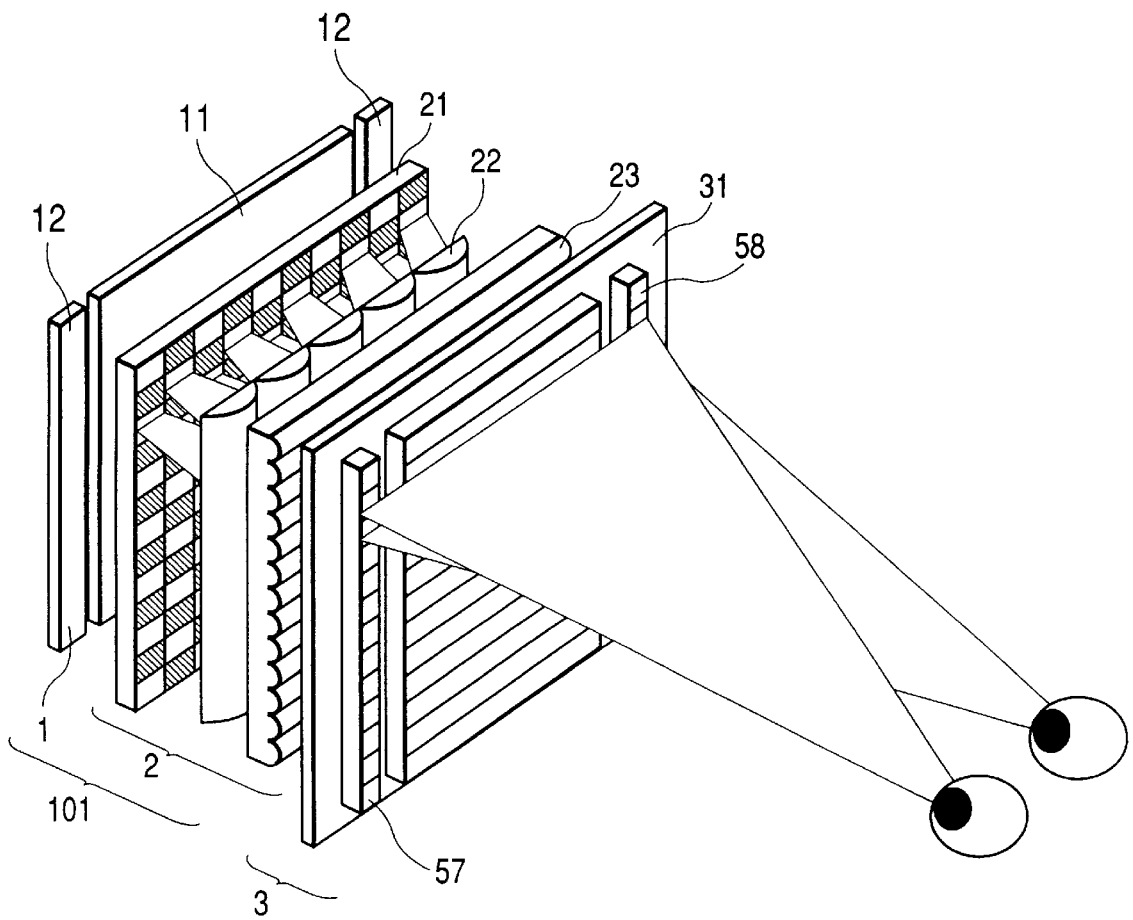
FIGS. 17A, 17B, and 17C are drawings to explain positioning adjustment in Embodiment 3.
Figure 17B:
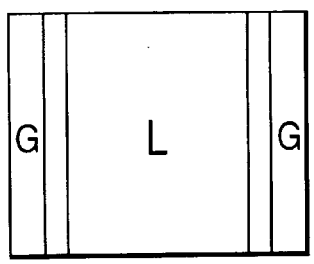
Figure 17C:
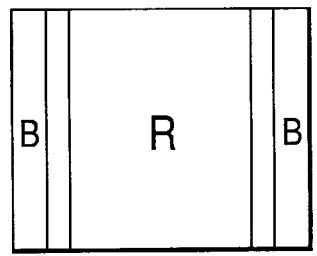

FIGS. 17A to 17C are explanatory drawings to explain the positioning adjustment in the present embodiment.

As shown in FIG. 17A, the optical system 2 of the illuminating apparatus 101 is arranged to illuminate the entire image-formed region also including the positioning images 57, 58 formed on the transmissive image sheet 3, so that the light passing the optical system 2 illuminates the left and right stripe parallax images L, R and the positioning images 57, 58 consisting of the blue and green image lines alternately provided in the rectangular shape of the same vertical width as that of the stripe parallax images.

Accordingly, when the positioning adjustment is done well between the optical system 2 and the transmissive image sheet 3, the positioning image portions are recognized in the single color of green (G) by the left eye as shown in FIG. 17B and in the single color of blue (B) by the right eye as shown in FIG. 17C. Namely, the positioning adjustment can be checked by placing the observer's eyes in the designed observation areas and singly viewing the image 57 or 58 by either the right eye or the left eye.

In the present embodiment, the above arrangement makes confirmation of success or failure of positioning easier, and permits the positional relation between the optical system 2 and the transmissive image sheet 3 to be adjusted so as to meet the conditions of good stereoscopic image viewing described in Embodiment 1, thus realizing the good display of stereoscopic still image.

As described above, the surface illuminant 11 for illumination of composite image and the surface illuminants 12 for positioning are arranged to be capable of being turned on or off independently of each other, and only the positioning surface illuminants 12 are turned off at the time of completion of the positioning adjustment between the optical system 2 and the transmissive image sheet 3. This is preferred because the light passing the positioning images does not reach the observer and the observer can appreciate only the composite image necessary for stereoscopic image viewing.

Instead of splitting the surface illuminant 1 as exemplified in the present embodiment, it can also be contemplated that the structure such as the frame-shaped image holding portion 44 shown in Embodiment 1 is arranged to cover the portions where the positioning images 57, 58 are formed and after completion of the positioning adjustment the positioning image portions are covered thereby.

Embodiment 4 of the present invention will be described below referring to FIG. 18 to FIGS. 20A, 20B, and 20C. The structure of the major part and the principle of stereoscopy in the present embodiment are also the same as in Embodiment 1 and the description thereof is omitted herein.

Figure 18:
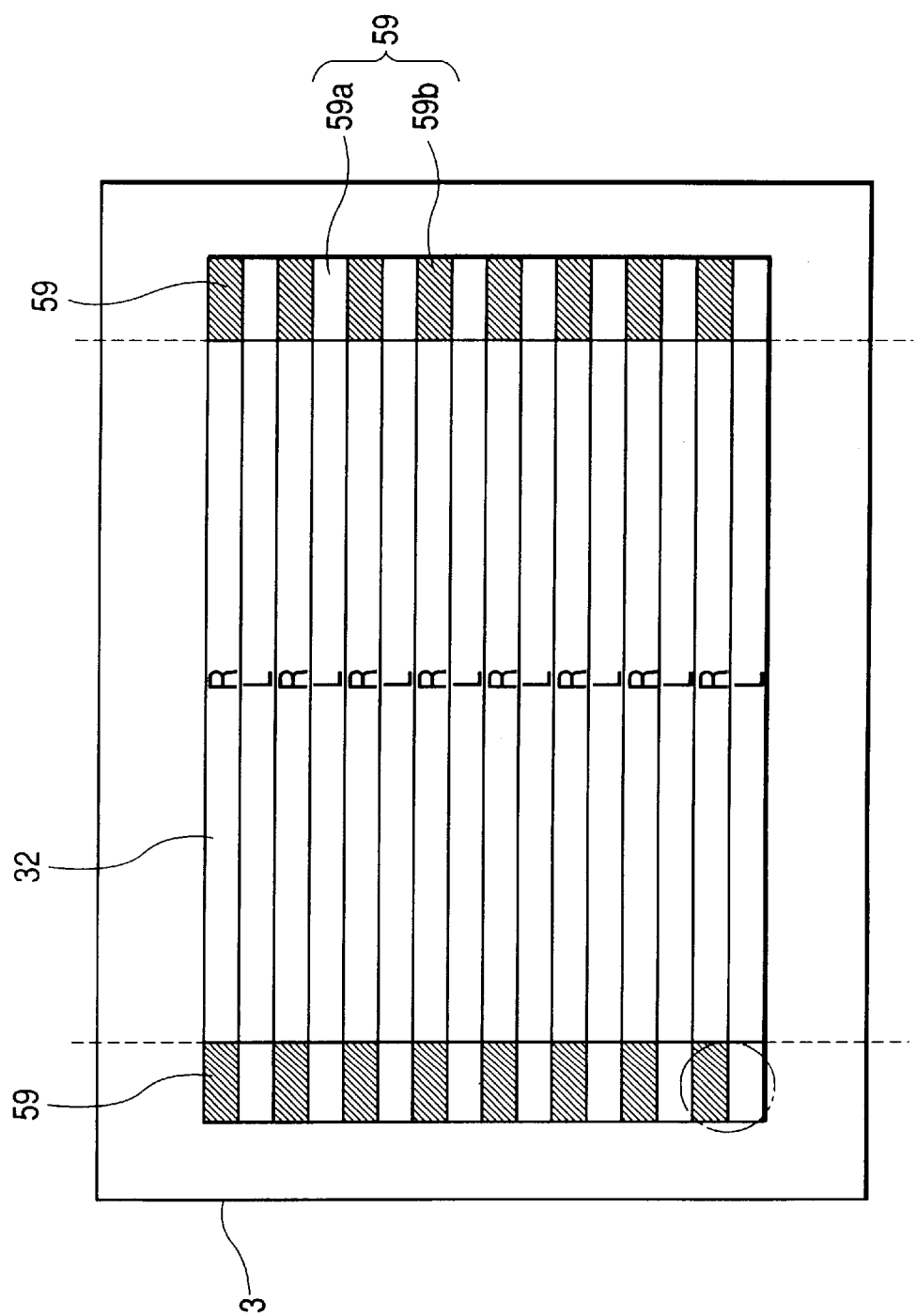
FIG. 18 is an explanatory drawing to illustrate the transmissive image sheet in Embodiment 4.
Figure 19:
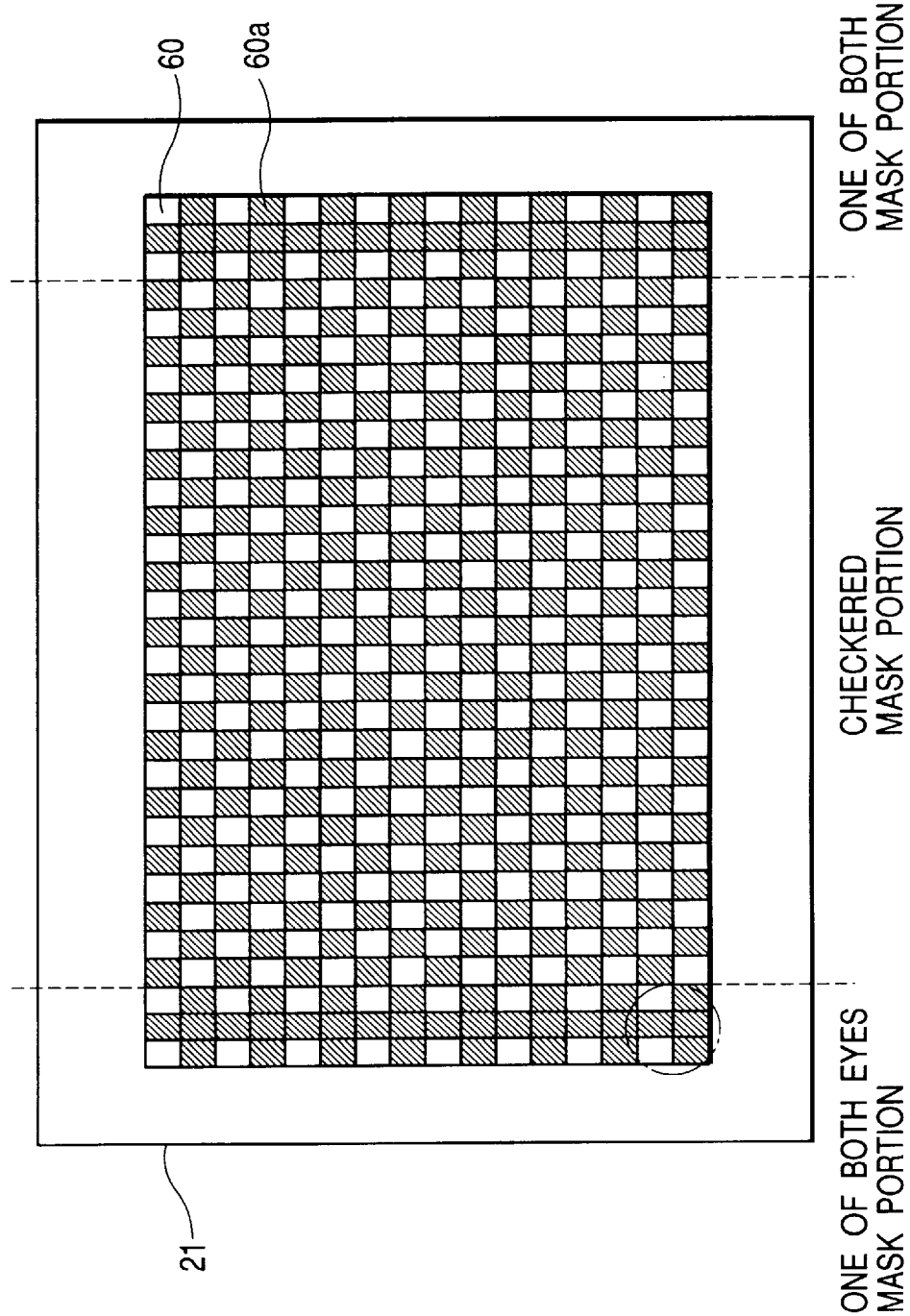
FIG. 19 is an explanatory drawing to illustrate a mask element of the optical system forming the illuminating apparatus of Embodiment 4.

FIG. 18 is an explanatory drawing of the transmissive image sheet 3 in the present embodiment and FIG. 19 is an explanatory drawing of the mask element 21 of the optical system 2 forming the illuminating apparatus 101 of the present embodiment. The present embodiment will be described referring to the drawings.

In FIG. 18, R, L denote the right stripe parallax images R and left stripe parallax images L combined in the same manner as the composite image 32 of Embodiment 1 described referring to FIG. 2 and formed on the transparent sheet 31 by use of the means such as the printer.

The present embodiment is different from Embodiment 1 in that as positioning marks (images) for positional adjustment between the illuminating apparatus 101 and the transmissive image sheet 3, positioning marks 59 consisting of transmitting lines 59a and shield lines 59b alternately formed are provided at the left and right ends of the portion where the composite image is formed. In this example, the shield lines 59b are formed at the both ends of each right stripe parallax image R and the transmitting lines 59a at the both ends of each left stripe parallax image L.

FIG. 19 is an explanatory drawing of the mask element 21 of the optical system 2 forming the illuminating apparatus 101 of the present embodiment, in which the aperture portions and shield portions of the mask pattern provided at the positions corresponding to the composite image R, L, on the mask element 21 are the same as those of the predetermined pattern described in Embodiment 1. The mask element 21 of the present embodiment is different from that of Embodiment 1 in that patterns of aperture portions and shield portions (positioning marks) 60 different from the predetermined pattern described above are formed at positions corresponding to the portions where the transmitting lines 59a and the shield lines 59b of the transmissive image sheet 3 for positional adjustment between the illuminating apparatus 101 and the transmissive image sheet 3 are formed.

Particularly, in the present embodiment, the patterns (positioning patterns) 60 are formed in such a manner that, without modifying the lines on the mask element 21 corresponding to the lines to illuminate the right stripe parallax images R on the transmissive image sheet 3, the shield portions 60a are provided in the all portions corresponding to the positioning image portions 59 of the transmissive image sheet 3 in the lines on the mask element 21 corresponding to the lines to illuminate the left stripe parallax images L on the transmissive image sheet 3. Here, the patterns 60 constitute an element of the positioning means.

In the present embodiment, the image sheet can also be produced by carrying out the same image process flow as in Embodiment 2, and the description thereof is omitted herein.

Figure 20A:
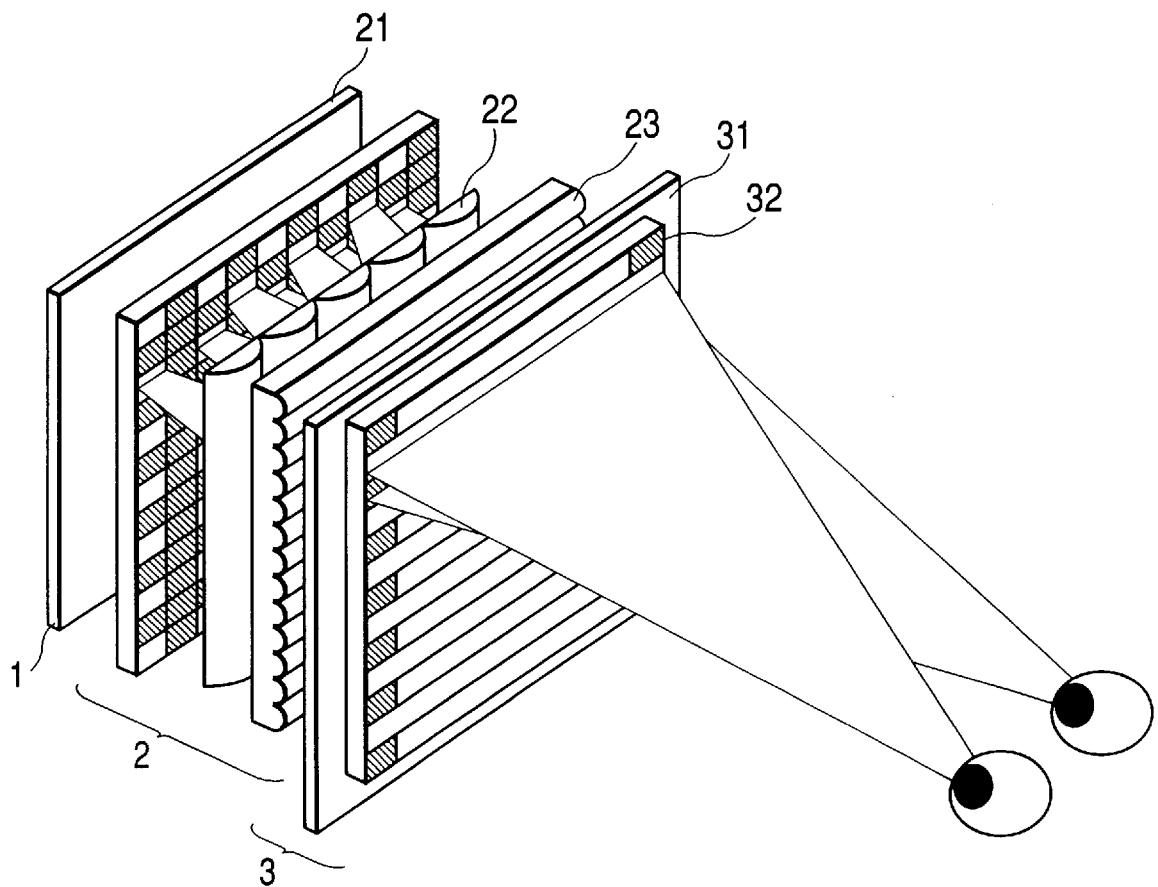
FIGS. 20A, 20B, and 20C are drawings to explain positioning adjustment in Embodiment 4.
Figure 20B:
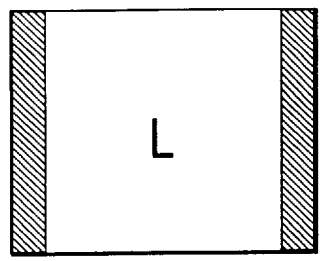
Figure 20C:
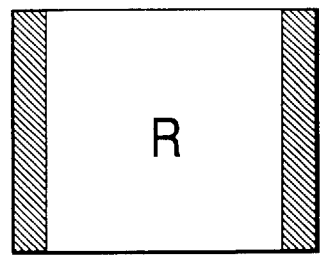

FIGS. 20A to 20C are explanatory drawings to explain the positioning adjustment between the optical system of the illuminating apparatus 101 and the transmissive image sheet 3 in the present embodiment. Because of the mask pattern arrangement on the mask element 21 as described above, the illumination light with directivity to the left or right eye alternately appears every line in the display image portion; whereas only the illumination light with directivity to the right eye appears every other line and no illumination light appears to the left eye in the positioning image portions.

Accordingly, when the transmissive image sheet 3 with the positioning images 59 formed as shown in FIG. 18 is used and when the positional adjustment is not achieved yet, the light reaches the right eye through the transmitting lines of the positioning image portions 59. When the positioning adjustment is done well as in the state of FIG. 20A, the illumination light to the right eye is intercepted by the shield lines of the positioning image portions, so that no light reaches the left and right eyes from the positioning image portions 59. Therefore, the observer recognizes the positioning image portions 59 as dark parts. Namely, the observer's left eye observes the view as shown in FIG. 20B and the observer's right eye the view as shown in FIG. 20C.

In the present embodiment, the above arrangement makes success or failure of positioning easier to check, and permits the positional relation between the optical system 2 and the transmissive image sheet 3 to be adjusted so as to meet the conditions of good stereoscopic image viewing described in Embodiment 1, thus achieving the good display of stereoscopic still image.

According to the present embodiment, when the positioning adjustment is done well, the portions of positioning images 59 are recognized as black (shield portions) by the observer. Therefore, the positioning images 59 do not become an eyesore after completion of positioning adjustment, and it obviates the need for provision of the means such as division of the surface illuminant 1 or the image frame for covering the positioning images as in Embodiment 3. This achieves the effect to reduce the number of parts.

Embodiment 5 of the present invention will be described referring to FIG. 21 and FIG. 22.

Figure 21:
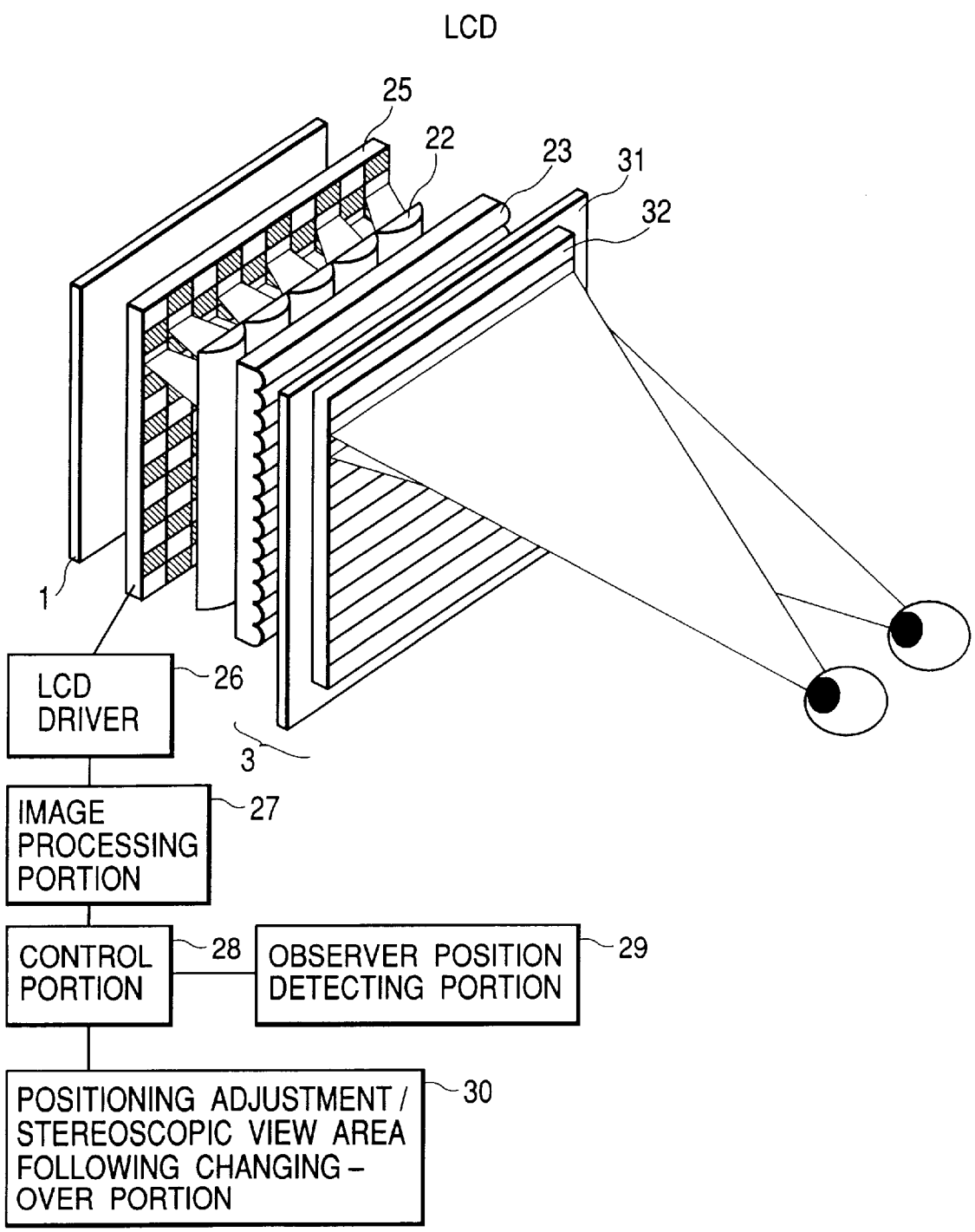
FIG. 21 is a structural drawing to show the major part of a stereoscopic still image display apparatus of Embodiment 5.

FIG. 21 is a structural drawing to show the major part of the stereoscopic image display apparatus of the present embodiment. The present embodiment is different from Embodiment 1 in that LCD 25 is used instead of the mask element 21 forming the optical system 2 and in that the aperture portions and shield portions similar to the mask patterns of the mask element 21 in Embodiment 1 are formed on the LCD 25.

In the present embodiment the apparatus is provided with LCD driver 26 for driving the LCD 25, image processing portion 27 for producing the pattern of the aperture portions and shield portions to be displayed on the LCD, control portion 28 for changing the pattern of aperture portions and shield portions with necessity, observer's position detecting portion 29 for detecting the observer's position, and positioning adjustment/stereoscopic view area tracking changeover portion 30 for performing changeover between a mode to carry out the positioning adjustment and a mode to track the area where stereoscopic image viewing is possible, according to movement of the observer.

The positioning method between the illuminating apparatus 101 and the transmissive image sheet 3 may be either one of those in Embodiments 1 to 4 described above.

The principle of stereoscopy in the present embodiment is also the same as in Embodiment 1 and the description thereof is omitted herein.

Figure 22:
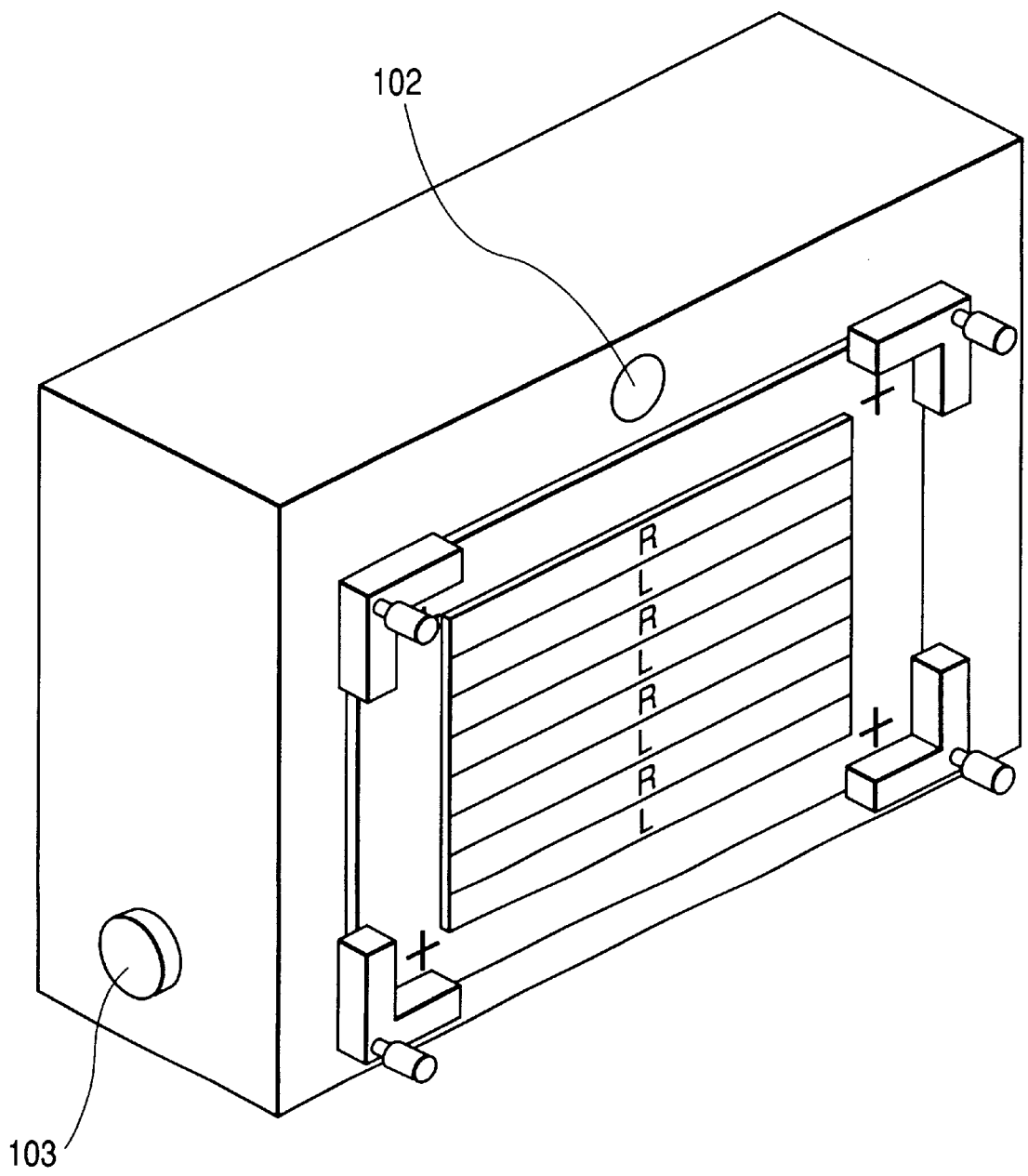
FIG. 22 is a perspective view to show the external view of the illuminating apparatus in Embodiment 5.

FIG. 22 is an external view of the display apparatus in the present embodiment. The present embodiment employs the same positioning marks and sheet holding mechanism as in the apparatus described in Embodiments 2 to 4, and the description of this positioning adjustment is omitted herein. The present embodiment is different in the appearance from the apparatus described in Embodiment 2 in that camera 102 and changeover button 103 are provided.

The process for displaying the aperture and shield patterns in the LCD 25 in the present embodiment will be described referring to FIG. 21 and FIG. 22.

First, for positioning of the composite image 32 and the optical system 2, the changeover button 103 is depressed. At this time the control portion 28 recognizes that the positioning adjustment mode is activated. Then the control portion 28 sends a signal to the image processing portion 27 to instruct the image processing portion 27 to produce the image data corresponding to the predetermined aperture and shield pattern. The image data corresponding to the predetermined aperture and shield pattern produced in the image processing portion 27 is sent to the LCD driver 26 and the LCD driver 26 forms the predetermined aperture and shield pattern on the LCD 25. This state continues until the changeover button 103 is again depressed. During that period, the predetermined aperture and shield pattern is displayed in the fixed state on the LCD 25.

After completion of the positioning, the changeover button 103 is again depressed, whereupon the control portion 28 recognizes that the positioning adjustment mode is completed and goes into the tracking mode. At this time data of an image of the observer from the camera 102 is processed in the observer's position detecting portion 29 and is sent as data indicating the observer's position to the control portion 28. The control portion 28 calculates the pitch and phase of the aperture and shield pattern so as to form the stereoscopic view area at the observer's position at the current time, based on the observer's position data, and sends this data to the image processing portion 27. The image processing portion 27 generates image data based on the data of the pitch and phase of the aperture and shield pattern and sends it to the LCD driver 26. The LCD driver 26 forms such an aperture and shield pattern as to form the stereoscopic view area at the observer's position on the LCD 25, based on the image data. This process is carried out in real time, whereby the observer can always recognize the composite image formed on the transparent sheet, as a stereoscopic image. This state is continued before the changeover button is again depressed. During that period, the aperture and shield pattern to vary according to the observer's position is displayed on the LCD 25.

For simplicity of description, only one type of optical system was described as the optical system forming the illuminating apparatus in each embodiment described above. It does not mean that the optical system according to the present invention is limited to the above-stated type, but various types of optical systems can be applied.

Figure 23:
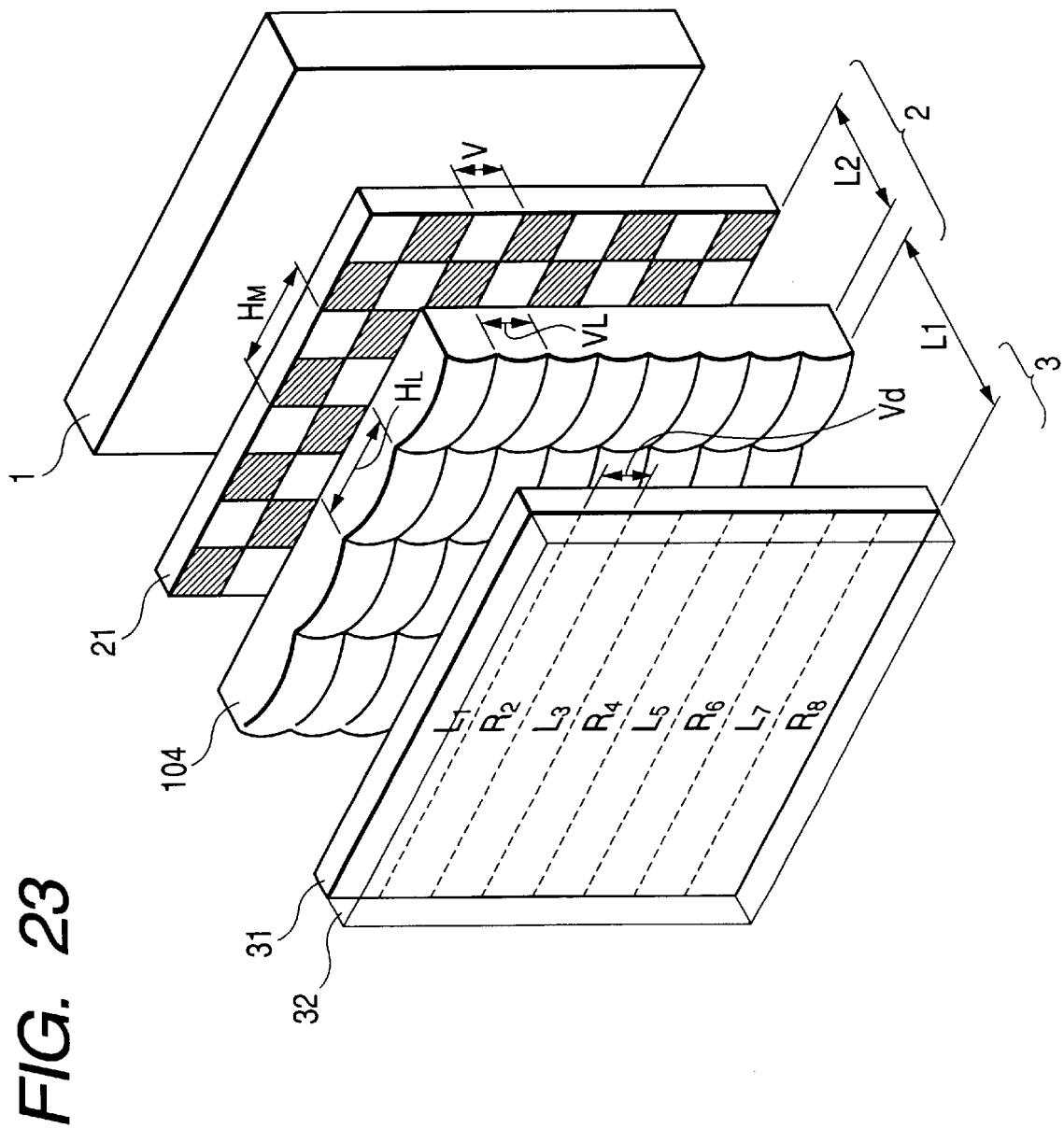
FIG. 23 is an explanatory drawing to illustrate another example of the optical system forming the display apparatus of the present invention.

For example, as shown in FIG. 23, the two cylindrical lens arrays 22, 23 forming the optical system 2 of FIG. 1 may be replaced by a toric lens array 104 consisting of many toric lenses, each lens having the same refracting powers in the horizontal and vertical directions as those of the cylindrical lenses.

Figure 24:
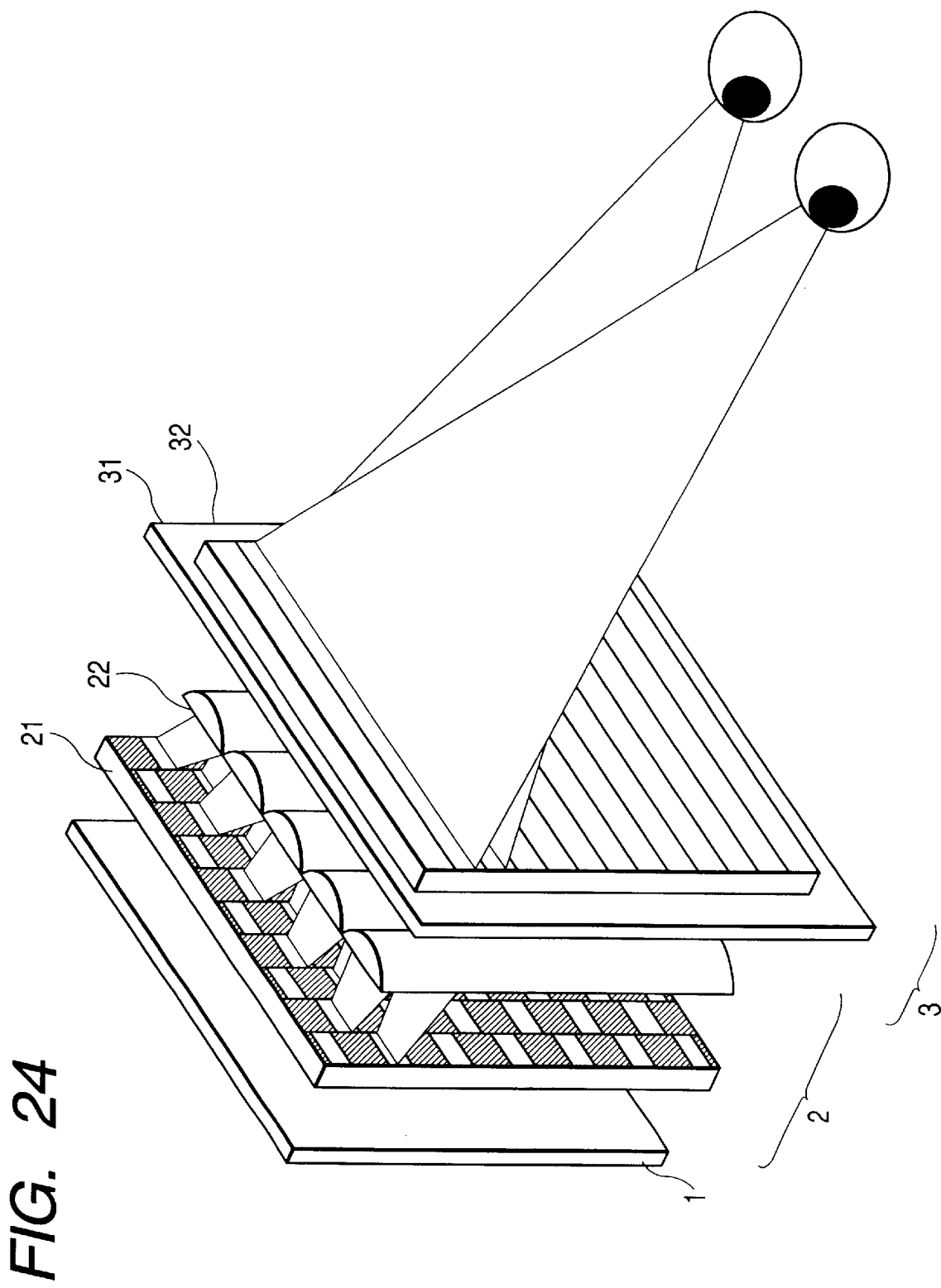
FIG. 24 is an explanatory drawing to illustrate still another example of the optical system forming the display apparatus of the present invention.

Another arrangement also applicable is one as shown in FIG. 24 in which the vertical aperture rate is decreased of the mask pattern provided on the mask element 21 forming the optical system 2 of FIG. 1 and the horizontal cylindrical lens array 23 is excluded.

Figure 25:
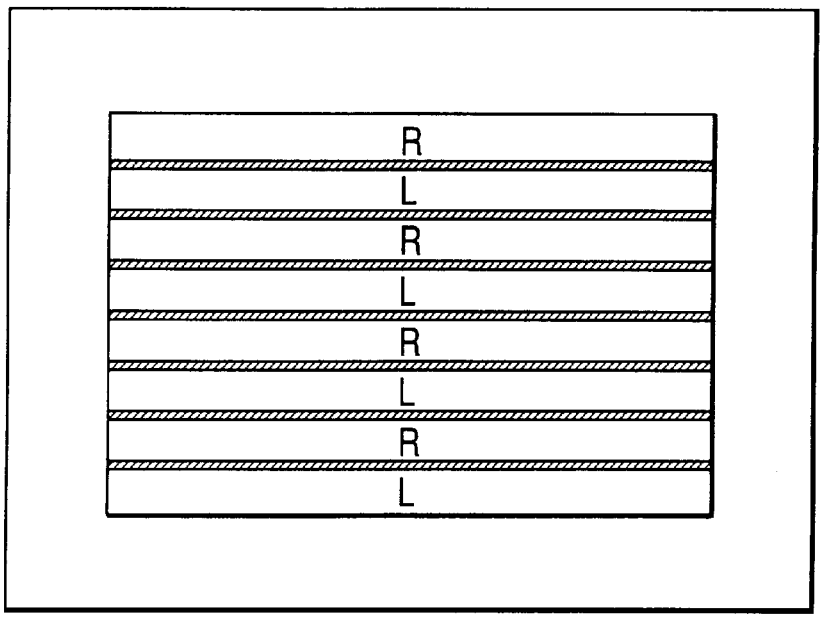
FIG. 25 is an explanatory drawing to illustrate another example of the transmissive image sheet of the present invention.

In the above description the transmissive image sheet 3 of the present invention was always described as one in which the composite image 32 was formed in the alternately abutting form of the image lines R, L, but shield portions (black lines) may be provided between the R, L lines, as shown in FIG. 25, because the illumination light could enter the eye different from the expected eye because of aberration of the optical system or the like near the border between the image lines R, L.

Figure 26:
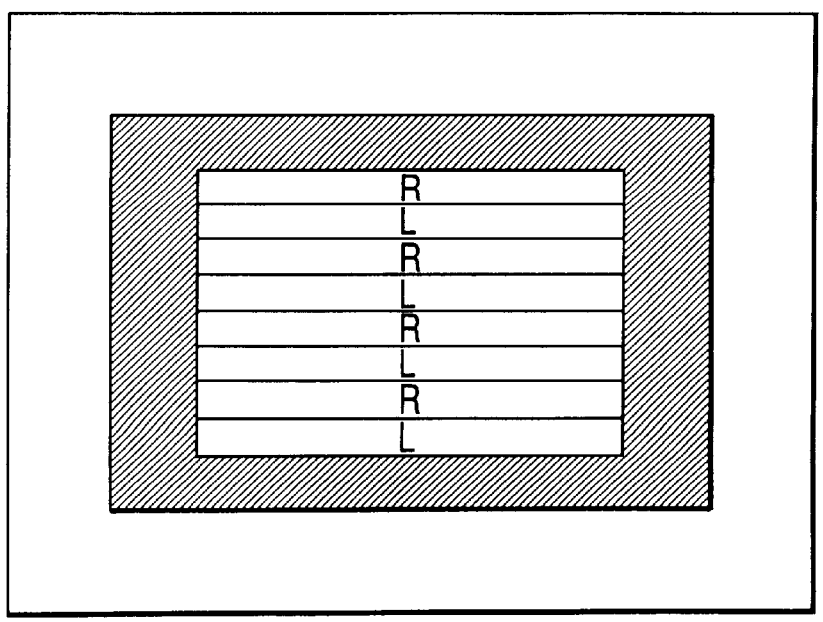
FIG. 26 is an explanatory drawing to illustrate still another example of the transmissive image sheet of the present invention.

In the above description the transmissive image sheet 3 of the present invention was always described as one in which the composite image 32 was displayed in the full effective display area on the sheet, but, without having to be limited to this, for example in the case wherein the composite image 32 of a small size is formed on the transmissive image sheet 3 as shown in FIG. 26, a shield region may be provided so as to prevent the illumination light passing between the composite image 32 and the effective display area from directly entering the observer's eyes.

What is claimed is:

1. A stereoscopic image display apparatus comprising:
   an illuminating apparatus having an optical system for guiding light with directivity in predetermined regularity; and
   a transmissive image sheet in which a stripe composite image produced by dividing a plurality of parallax images into stripes and arranging the stripes in a predetermined order is provided on a surface of a transparent sheet;
   wherein the transmissive image sheet is detachably mounted on the illuminating apparatus and is illuminated by the light through the optical system, whereby the stripe composite image is observed as a stereoscopic image.

2. A stereoscopic image display apparatus according to claim 1, wherein:
   said illuminating apparatus further has an illumination light source, and
   said optical system changes light from the illumination light source into patterned beams by a mask element consisting of a plurality of aperture portions and shield portions arrayed at a predetermined pitch in a horizontal direction and at a predetermined pitch in a vertical direction and for guiding the patterned beams onto a predetermined surface with directivity by a microlens element.

3. A stereoscopic image display apparatus according to claim 2, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

4. A stereoscopic image display apparatus according to claim 2, wherein said microlens element has a vertical cylindrical lens array comprising a lot of vertical cylindrical lenses having refracting power in the horizontal direction and extending in the vertical direction, wherein a beam outgoing from a point on a mask aperture of a mask pattern formed on said mask element is converted to a nearly parallel beam in the horizontal direction by the vertical cylindrical lens array.

5. A stereoscopic image display apparatus according to claim 2, wherein said microlens element comprises a vertical cylindrical lens array comprising a lot of vertical cylindrical lenses having refracting power in the horizontal direction and extending in the vertical direction, and a horizontal cylindrical lens array comprising a lot of horizontal cylindrical lenses having refracting power in the vertical direction and extending in the horizontal direction, wherein a beam outgoing from a point on a mask aperture of a mask pattern formed on said mask element is converted to a nearly parallel beam in the horizontal direction by the vertical cylindrical lens array and is converted to a converging beam in the vertical direction by the horizontal cylindrical lens array.

6. A stereoscopic image display apparatus according to claim 2, wherein said microlens element comprises a toric lens array comprising a lot of toric lenses arrayed in the horizontal and vertical directions, said toric lenses having refracting power in the horizontal direction and refracting power in the vertical direction different from each other, and wherein a beam outgoing from a point on a mask aperture of a mask pattern formed on said mask element is converted to a nearly parallel beam in the horizontal direction by the toric lens array and is converted to a converging beam nearly converged at a position of a surface of the transmissive image sheet in the vertical direction by the toric lens array.

7. A stereoscopic image display apparatus according to claim 2, wherein said mask element is a transmissive display device and wherein said display device adjusts an array of the mask pattern consisting of the aperture portions and shield portions.

8. A stereoscopic image display apparatus according to claim 7, wherein the array of the mask pattern consisting of the aperture portions and shield portions, displayed by said display device, is variable based on a signal from the outside, said stereoscopic image display apparatus having changeover means for performing changeover between a mode in which the variable array of the mask pattern consisting of the aperture portions and shield portions is dynamically displayed based on an external signal and a mode in which the array of the mask pattern is fixed in a predetermined state.

9. A stereoscopic image display apparatus according to claim 1, wherein:
said illuminating apparatus is housed in a housing; and
the transmissive image sheet is detachably mounted on the housing and the stripe composite image illuminated by the light from the illuminating apparatus is observed as a stereoscopic image, and wherein the transmissive image sheet is mounted on the housing so that a position of the transmissive image sheet can be adjusted by adjusting means.

10. A stereoscopic image display apparatus according to claim 9, wherein:
said illuminating apparatus further has an illumination light source, and said optical system and said illumination light source are housed in said housing, said optical system being arranged to change light from the illumination light source to patterned beams by a mask element consisting of plural aperture portions and shield portions arrayed at a predetermined pitch in a horizontal direction and at a predetermined pitch in a vertical direction and to guide the patterned beams onto a predetermined surface with directivity by a microlens element.

11. A stereoscopic image display apparatus according to claim 9, wherein said adjusting means has a function to permit said transmissive image sheet to be moved vertically relative to said housing and to be rotated relative to said housing.

12. A stereoscopic image display apparatus according to claim 10, wherein said adjusting means has a function to permit said transmissive image sheet to be moved vertically relative to said housing and to be rotated relative to said housing.

13. A stereoscopic image display apparatus according to claim 1, wherein:
said optical system for guiding light from the illumination light source onto a predetermined surface with directivity in predetermined regularity is housed in a housing; and
the transmissive image sheet is detachably mounted on the housing and the stripe composite image illuminated by the light from the illuminating apparatus is observed as a stereoscopic image, and wherein said illuminating apparatus and said transmissive image sheet are provided with a positioning mark for positioning between said illuminating apparatus and said transmissive image sheet.

14. A stereoscopic image display apparatus according to claim 13, wherein:
said illuminating apparatus further has an illumination light source which is housed in said housing, and said optical system being arranged to change light from the illumination light source to patterned beams by a mask element consisting of plural aperture portions and shield portions arrayed at a predetermined pitch in a horizontal direction and in a vertical direction and to guide the patterned beams onto a predetermined surface with directivity by a microlens element.

15. A stereoscopic image display apparatus according to claim 13, wherein said positioning mark is provided on said housing and on said transmissive image sheet.

16. A stereoscopic image display apparatus according to claim 14, wherein said positioning mark is provided on said housing and on said transmissive image sheet.

17. A stereoscopic image display apparatus according to claim 1, wherein:
said optical system for guiding light from said illumination light source onto a predetermined surface with directivity in predetermined regularity is housed in a housing; and
the transmissive image sheet is detachably mounted on the housing and the stripe composite image illuminated by the light from the illuminating apparatus is observed as a stereoscopic image, and wherein said transmissive image sheet is provided with a positioning mark for positioning relative to said illuminating apparatus.

18. A stereoscopic image display apparatus according to claim 17, wherein said illuminating apparatus has a mask element provided with a positioning pattern corresponding to said positioning mark.

19. A stereoscopic image display apparatus according to claim 17, wherein:
said illuminating apparatus further has an illumination light source which is housed in said housing, and said optical system being arranged to change light from the illumination light source to patterned beams by a mask element consisting of plural aperture portions and shield portions arrayed at a predetermined pitch in a horizontal direction and at a predetermined pitch in a vertical direction and to guide the patterned beams with directivity by a microlens element.

20. A stereoscopic image display apparatus according to claim 19, wherein said mask element is provided with a positioning pattern corresponding to said positioning mark.

21. A stereoscopic image display apparatus according to claim 10, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

22. A stereoscopic image display apparatus according to claim 14, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

23. A stereoscopic image display apparatus according to claim 19, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

24. A stereoscopic image display apparatus according to claim 10, wherein said microlens element has a vertical cylindrical lens array comprising a lot of vertical cylindrical lenses having refracting power in the horizontal direction and extending in the vertical direction, wherein a beam outgoing from a point on a mask aperture of a mask pattern formed on said mask element is converted to a nearly parallel beam in the horizontal direction by the vertical cylindrical lens array.

25. A stereoscopic image display apparatus according to claim 14, wherein said microlens element has a vertical cylindrical lens array comprising a lot of vertical cylindrical lenses having refracting power in the horizontal direction and extending in the vertical direction, wherein a beam outgoing from a point on a mask aperture of a mask pattern formed on said mask element is converted to a nearly parallel beam in the horizontal direction by the vertical cylindrical lens array.

26. A stereoscopic image display apparatus according to claim 19, wherein said microlens element has a vertical cylindrical lens array comprising a lot of vertical cylindrical lenses having refracting power in the horizontal direction and extending in the vertical direction, wherein a beam outgoing from a point on a mask aperture of a mask pattern formed on said mask element is converted to a nearly parallel beam in the horizontal direction by the vertical cylindrical lens array.

27. A stereoscopic image display apparatus according to claim 10, wherein said microlens element comprises a vertical cylindrical lens array comprising a lot of vertical cylindrical lenses having refracting power in the horizontal direction and extending in the vertical direction, and a horizontal cylindrical lens array comprising a lot of horizontal cylindrical lenses having refracting power in the vertical direction and extending in the horizontal direction, wherein a beam outgoing from a point on a mask aperture of a mask pattern formed on said mask element is converted to a nearly parallel beam in the horizontal direction by the vertical cylindrical lens array and is converted to a converging beam in the vertical direction by the horizontal cylindrical lens array.

28. A stereoscopic image display apparatus according to claim 14, wherein said microlens element comprises a vertical cylindrical lens array comprising a lot of vertical cylindrical lenses having refracting power in the horizontal direction and extending in the vertical direction, and a horizontal cylindrical lens array comprising a lot of horizontal cylindrical lenses having refracting power in the vertical direction and extending in the horizontal direction, wherein a beam outgoing from a point on a mask aperture of a mask pattern formed on said mask element is converted to a nearly parallel beam in the horizontal direction by the vertical cylindrical lens array and is converted to a converging beam in the vertical direction by the horizontal cylindrical lens array.

29. A stereoscopic image display apparatus according to claim 19, wherein said microlens element comprises a vertical cylindrical lens array comprising a lot of vertical cylindrical lenses having refracting power in the horizontal direction and extending in the vertical direction, and a horizontal cylindrical lens array comprising a lot of horizontal cylindrical lenses having refracting power in the vertical direction and extending in the horizontal direction, wherein a beam outgoing from a point on a mask aperture of a mask pattern formed on said mask element is converted to a nearly parallel beam in the horizontal direction by the vertical cylindrical lens array and is converted to a converging beam in the vertical direction by the horizontal cylindrical lens array.

30. A stereoscopic image display apparatus according to claim 10, wherein said microlens element comprises a toric lens array comprising a lot of toric lenses arrayed in the horizontal and vertical directions, said toric lenses having refracting power in the horizontal direction and refracting power in the vertical direction different from each other, and wherein a beam outgoing from a point on a mask aperture of a mask pattern formed on said mask element is converted to a nearly parallel beam in the horizontal direction by the toric lens array and is converted to a converging beam nearly converged at a position of a surface of the transmissive image sheet in the vertical direction by the toric lens array.

31. A stereoscopic image display apparatus according to claim 14, wherein said microlens element comprises a toric lens array comprising a lot of toric lenses arrayed in the horizontal and vertical directions, said toric lenses having refracting power in the horizontal direction and refracting power in the vertical direction different from each other, and wherein a beam outgoing from a point on a mask aperture of a mask pattern formed on said mask element is converted to a nearly parallel beam in the horizontal direction by the toric lens array and is converted to a converging beam nearly converged at a position of a surface of the transmissive image sheet in the vertical direction by the toric lens array.

32. A stereoscopic image display apparatus according to claim 19, wherein said microlens element comprises a toric lens array comprising a lot of toric lenses arrayed in the horizontal and vertical directions, said toric lenses having refracting power in the horizontal direction and refracting power in the vertical direction different from each other, and wherein a beam outgoing from a point on a mask aperture of a mask pattern formed on said mask element is converted to a nearly parallel beam in the horizontal direction by the toric lens array and is converted to a converging beam nearly converged at a position of a surface of the transmissive image sheet in the vertical direction by the toric lens array.

33. A stereoscopic image display apparatus according to claim 10, wherein said mask element is a transmissive display device and wherein said display device adjusts an array of the mask pattern consisting of the aperture portions and shield portions.

34. A stereoscopic image display apparatus according to claim 14, wherein said mask element is a transmissive display device and wherein said display device adjusts an array of the mask pattern consisting of the aperture portions and shield portions.

35. A stereoscopic image display apparatus according to claim 20, wherein said mask element is a transmissive display device and wherein said display device adjusts an array of the mask pattern consisting of the aperture portions and shield portions.

36. A stereoscopic image display apparatus according to claim 33, wherein the array of the mask pattern consisting of the aperture portions and shield portions, displayed by said display device, is variable based on a signal from the outside, said stereoscopic image display apparatus having changeover means for performing changeover between a mode in which the variable array of the mask pattern consisting of the aperture portions and shield portions is dynamically displayed based on an external signal and a mode in which the array of the mask pattern is fixed in a predetermined state.

37. A stereoscopic image display apparatus according to claim 34, wherein the array of the mask pattern consisting of the aperture portions and shield portions, displayed by said display device, is variable based on a signal from the outside, said stereoscopic image display apparatus having changeover means for performing changeover between a mode in which the variable array of the mask pattern consisting of the aperture portions and shield portions is dynamically displayed based on an external signal and a mode in which the array of the mask pattern is fixed in a predetermined state.

38. A stereoscopic image display apparatus according to claim 35, wherein the array of the mask pattern consisting of the aperture portions and shield portions, displayed by said display device, is variable based on a signal from the outside, said stereoscopic image display apparatus having changeover means for performing changeover between a mode in which the variable array of the mask pattern consisting of the aperture portions and shield portions is dynamically displayed based on an external signal and a mode in which the array of the mask pattern is fixed in a predetermined state.

39. A transmissive image sheet in which a stripe composite image is formed on a surface of a transparent sheet, said transmissive image sheet being detachably mounted on an illuminating apparatus for emitting illumination light with predetermined directivity, said transmissive image sheet being used in an apparatus arranged to illuminate said stripe composite image in which a plurality of stripe parallax images of a stripe shape are arrayed at a predetermined pitch, by the illumination light, thereby permitting the composite image to be observed as a stereoscopic image.

40. A transmissive image sheet according to claim 39, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

41. A transmissive image sheet according to claim 40, comprising a positioning mark for positioning relative to said illuminating apparatus.

42. A transmissive image sheet according to claim 41, wherein vertical pitch of said horizontal stripe composite image is equal to vertical pitch of said positioning mark.

43. A transmissive image sheet according to claim 41, wherein said positioning mark is provided in a non-effective area where effective light for stereoscopic image viewing does not pass upon observation of stereoscopic image.

44. A transmissive image sheet according to claim 41, wherein said positioning mark is formed separately from said composite image.

45. A transmissive image sheet according to claim 41, wherein said positioning mark is formed at the left and right ends of said composite image.

46. A transmissive image sheet according to claim 41, wherein said positioning mark comprises a plurality of patterns of different colors.

47. An illuminating apparatus for illuminating, by light with predetermined directivity, a transmissive image sheet in which a stripe composite image in which a plurality of stripe parallax images of a stripe shape are arrayed at a predetermined pitch is provided on a surface of a transparent sheet, thereby permitting said stripe composite image to be observed as a stereoscopic image.

48. An illuminating apparatus according to claim 47, comprising an illumination light source and, a mask element consisting of a plurality of aperture portions and shielding portions arrayed at a predetermined pitch in a horizontal direction and at a predetermined pitch in a vertical direction and a microlens element for giving said predetermined directivity to the light.

49. An illuminating apparatus according to claim 47, comprising a positioning mark or positioning means for positioning relative to said transmissive image sheet.

50. An illuminating apparatus according to claim 49, comprising first illuminating means for illuminating the composite image formed on said transmissive image sheet with the predetermined directivity, and second illuminating means for illuminating the positioning mark formed on said transmissive image sheet.

51. An illuminating apparatus according to claim 50, wherein said second illuminating means forms a positioning pattern in a portion on a mask element corresponding to a non-effective area where effective light for stereoscopic image viewing does not pass after completion of positioning.

52. An image processing method for producing a transmissive image sheet by forming on a surface of a transparent sheet a stripe composite image produced by dividing a plurality of parallax images into stripes and arranging the stripes in a predetermined order, and a positioning mark for positioning the transmissive image sheet relative to an illuminating apparatus when the transmissive image sheet is detachably mounted on the illuminating apparatus, said illuminating apparatus being arranged to illuminate said stripe composite image to observe the stripe composite image as a stereoscopic image, wherein said image processing method comprises a process of combining image data of the stripe composite image with image data of the positioning mark to produce one image data.

53. An image processing method according to claim 52, wherein said stripe composite image is a horizontal stripe composite image obtained by dividing a plurality of parallax images into horizontal stripes which are a predetermined number of horizontal lines arrayed in the vertical direction and arranging the horizontal stripes in a predetermined order.

* * * * *

UNITED STATES PATENT AND TRADEMARK OFFICE
CERTIFICATE OF CORRECTION

PATENT NO. : 6,215,594 B1
DATED : April 10, 2001
INVENTOR(S) : Kazutaka Inoguchi et al.

It is certified that error appears in the above-identified patent and that said Letters Patent is hereby corrected as shown below:

Title page,
Item [73] Assignee, "Kanagawa-ken (JP)" should read -- Yokohama (JP) --.

Column 14,
Line 3, "a re" should read -- are --.

Column 15,
Line 49, "the all" should read -- all the --.

Signed and Sealed this

Eighth Day of January, 2002

Attest:

*Attesting Officer*

JAMES E. ROGAN
*Director of the United States Patent and Trademark Office*

Disclaimer

6,215,594—Kazutaka Inoguchi, Kawasaki; Naosato Taniguchi, Urawa; Hideki Morishima, Kawasaki; Hiroyasu Nose, Tokyo; Tsutomu Osaka, Kawasaki all of Japan. STEREOSCOPIC IMAGE DISPLAY APPARATUS AND IMAGE PROCESSING METHOD. Patent dated April 10, 2001. Disclaimer filed June 3, 2002 by the assignee, Mixed Reality System Laboratory Inc.

Hereby enters this disclaimer to all of the claims (claims 1-53).

*(Official Gazette, August 13, 2002)*